United States Patent
Lutnick et al.

(10) Patent No.: US 10,964,170 B2
(45) Date of Patent: *Mar. 30, 2021

(54) SYSTEM AND METHOD FOR GAMING BASED UPON INTERMEDIATE POINTS IN A RACE EVENT

(71) Applicant: CFPH, LLC, New York, NY (US)

(72) Inventors: Howard W. Lutnick, New York, NY (US); Mark Miller, Chicago, IL (US)

(73) Assignee: CFPH, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/685,332

(22) Filed: Nov. 15, 2019

(65) Prior Publication Data

US 2020/0082674 A1 Mar. 12, 2020

Related U.S. Application Data

(63) Continuation of application No. 15/876,997, filed on Jan. 22, 2018, now Pat. No. 10,482,716, which is a continuation of application No. 15/350,608, filed on Nov. 14, 2016, now Pat. No. 9,875,619, which is a continuation of application No. 13/589,283, filed on Aug. 20, 2012, now Pat. No. 9,492,735, which is a continuation of application No. 12/020,838, filed on Jan. 28, 2008, now Pat. No. 8,246,432.

(51) Int. Cl.
| | |
|---|---|
| *G07F 17/32* | (2006.01) |
| *A63F 1/04* | (2006.01) |
| *A63F 1/18* | (2006.01) |
| *A63F 9/14* | (2006.01) |
| *A63F 13/80* | (2014.01) |

(52) U.S. Cl.
CPC ............ *G07F 17/3288* (2013.01); *A63F 1/04* (2013.01); *A63F 1/18* (2013.01); *A63F 9/14* (2013.01); *A63F 13/80* (2014.09); *G07F 17/32* (2013.01); *G07F 17/3225* (2013.01); *G07F 17/3244* (2013.01)

(58) Field of Classification Search
CPC ............ G07F 17/3288; G07F 17/3211; G07F 17/3225; G07F 17/323; G07F 17/326; A63F 3/00082; A63F 9/00; A63K 1/00
See application file for complete search history.

(56) References Cited

U.S. PATENT DOCUMENTS

| | | |
|---|---|---|
| 3,534,963 A | 10/1970 | Weimer |
| 4,248,458 A | 2/1981 | Brody |
| 4,288,077 A | 9/1981 | Rose et al. |
| 4,781,377 A | 11/1988 | McVean et al. |
| 5,149,101 A | 9/1992 | Mazza et al. |
| 5,241,487 A | 8/1993 | Bianco |

(Continued)

FOREIGN PATENT DOCUMENTS

| | | |
|---|---|---|
| CA | 2427718 A | 5/2001 |
| GB | 2192553 | 1/1988 |

(Continued)

OTHER PUBLICATIONS

Mark Twain, "The Celebrated Jumping Frog of Calaveras County", 1867, All pages.

(Continued)

*Primary Examiner* — Omkar A Deodhar

(57) ABSTRACT

Systems and methods related to gaming based on the results at intervals of a race. Other embodiments are disclosed.

18 Claims, 7 Drawing Sheets

(56) References Cited

U.S. PATENT DOCUMENTS

| | | |
|---|---|---|
| 5,275,400 A | 1/1994 | Weingardt et al. |
| 5,393,057 A | 2/1995 | Marnell, II |
| 5,398,938 A | 3/1995 | Money |
| 5,411,258 A | 5/1995 | Wilson et al. |
| 5,472,194 A | 12/1995 | Breeding et al. |
| 5,518,239 A | 5/1996 | Johnston |
| 5,687,968 A | 11/1997 | Tarantino |
| 5,731,788 A | 3/1998 | Reeds |
| 5,743,525 A | 4/1998 | Haddad |
| 5,749,582 A | 5/1998 | Fritz et al. |
| 5,788,574 A | 8/1998 | Ornstein |
| 5,795,226 A | 8/1998 | Yi |
| 5,823,872 A | 10/1998 | Prather et al. |
| 5,839,726 A | 11/1998 | Luise |
| 5,842,921 A | 12/1998 | Mindes et al. |
| 5,853,173 A | 12/1998 | Murphy |
| 5,934,673 A | 8/1999 | Telarico et al. |
| 5,938,200 A | 8/1999 | Markowitz et al. |
| 5,957,775 A | 9/1999 | Cherry |
| 5,976,015 A | 11/1999 | Seelig et al. |
| 6,007,427 A | 12/1999 | Weiner et al. |
| 6,020,851 A | 2/2000 | Busack |
| 6,024,641 A | 2/2000 | Sarno |
| 6,120,376 A | 9/2000 | Cherry |
| 6,152,822 A | 11/2000 | Herbert |
| 6,173,955 B1 | 1/2001 | Perrie et al. |
| 6,193,605 B1 | 2/2001 | Libby et al. |
| 6,280,324 B1 | 8/2001 | Tenenbaum |
| 6,309,307 B1 | 10/2001 | Krause et al. |
| 6,331,148 B1 | 12/2001 | Krause et al. |
| 6,346,044 B1 | 2/2002 | McCrea, Jr. |
| 6,368,216 B1 | 4/2002 | Hedrick et al. |
| 6,380,911 B1 | 4/2002 | Eaton |
| 6,450,887 B1 | 9/2002 | Mir et al. |
| 6,504,483 B1 | 1/2003 | Richards et al. |
| 6,592,459 B2 | 7/2003 | Parra et al. |
| 6,645,073 B2 | 11/2003 | Lemay et al. |
| 6,656,044 B1 | 12/2003 | Lewis |
| 6,688,978 B1 | 2/2004 | Herman |
| 6,758,473 B2 | 7/2004 | Seelig et al. |
| 6,793,575 B2 | 9/2004 | Brown et al. |
| 6,802,774 B1 | 10/2004 | Carlson et al. |
| 6,837,789 B2 | 1/2005 | Garahi et al. |
| 7,118,108 B2 | 10/2006 | Yu et al. |
| 7,172,508 B2 | 2/2007 | Simon et al. |
| 7,306,514 B2 | 12/2007 | Amaitis et al. |
| 7,713,125 B2 | 5/2010 | Asher et al. |
| 8,192,262 B2 | 6/2012 | Amaitis et al. |
| 8,246,431 B2 | 8/2012 | Amaitis et al. |
| 8,246,432 B2 | 8/2012 | Lutnick et al. |
| 8,491,366 B2 | 7/2013 | Amaitis et al. |
| 8,500,529 B2 | 8/2013 | Amaitis et al. |
| 8,777,709 B2 | 7/2014 | Amaitis et al. |
| 9,492,735 B2 | 11/2016 | Lutnick et al. |
| 10,311,678 B2 | 6/2019 | Amaitis et al. |
| 2001/0003715 A1 | 6/2001 | Jutze et al. |
| 2001/0041612 A1 | 11/2001 | Garahi et al. |
| 2003/0003990 A1 | 1/2003 | Von Kohorn |
| 2003/0062677 A1 | 4/2003 | Streeks et al. |
| 2003/0096643 A1 | 5/2003 | Montgomery |
| 2003/0151554 A1 | 8/2003 | McCarthy |
| 2003/0155470 A1 | 8/2003 | Young et al. |
| 2003/0157976 A1 | 8/2003 | Simon et al. |
| 2003/0207709 A1 | 11/2003 | Paotrakul |
| 2003/0209855 A1 | 11/2003 | Wilson |
| 2003/0224847 A1 | 12/2003 | Jaimet |
| 2004/0009796 A1 | 1/2004 | Ludlow |
| 2004/0009812 A1 | 1/2004 | Scott et al. |
| 2004/0053659 A1 | 3/2004 | Rothkranz et al. |
| 2004/0078208 A1 | 4/2004 | Burwell |
| 2004/0090001 A1 | 5/2004 | Lydick |
| 2004/0104845 A1 | 6/2004 | McCarthy |
| 2004/0135677 A1 | 7/2004 | Asam |
| 2004/0147300 A1 | 7/2004 | Seelig et al. |
| 2004/0193469 A1 | 9/2004 | Amaitis et al. |
| 2004/0193531 A1 | 9/2004 | Amaitis et al. |
| 2004/0198483 A1 | 10/2004 | Amaitis et al. |
| 2004/0204216 A1 | 10/2004 | Schugar |
| 2004/0204245 A1 | 10/2004 | Amaitis et al. |
| 2005/0003888 A1 | 1/2005 | Asher et al. |
| 2005/0040592 A1 | 2/2005 | Adams, III |
| 2005/0064934 A1 | 3/2005 | Amaitis et al. |
| 2005/0107151 A1 | 5/2005 | Amaitis et al. |
| 2005/0170886 A1 | 8/2005 | Miller |
| 2005/0181862 A1 | 8/2005 | Asher et al. |
| 2005/0187000 A1 | 8/2005 | Miller |
| 2005/0203714 A9 | 9/2005 | Vincenzini |
| 2005/0227757 A1 | 10/2005 | Simon |
| 2005/0245305 A1 | 11/2005 | Asher et al. |
| 2005/0245306 A1 | 11/2005 | Asher et al. |
| 2005/0288081 A1 | 12/2005 | Amaitis et al. |
| 2006/0009279 A1 | 1/2006 | Amaitis et al. |
| 2008/0139316 A1 | 6/2008 | He |
| 2014/0323188 A1 | 10/2014 | Amaitis et al. |
| 2017/0061740 A1 | 3/2017 | Lutnick et al. |
| 2018/0144585 A1 | 5/2018 | Lutnick et al. |
| 2019/0266848 A1 | 8/2019 | Amaitis et al. |
| 2020/0090470 A1 | 3/2020 | Amaitis et al. |

FOREIGN PATENT DOCUMENTS

| | | |
|---|---|---|
| GB | 2316629 | 3/1998 |
| GB | 2361080 | 10/2001 |
| GB | 2382484 | 5/2003 |
| JP | 07-028959 | 4/1995 |
| JP | 8160167 | 6/1996 |
| JP | H09-034959 | 2/1997 |
| JP | 63-115582 | 5/1998 |
| JP | 2000137063 | 5/2000 |
| JP | 2000-227968 | 8/2000 |
| JP | 2001-118018 | 4/2001 |
| JP | 3077268 | 5/2001 |
| JP | 2002-041809 | 2/2002 |
| JP | 2002-325977 | 11/2002 |
| JP | 2002-542735 | 12/2002 |
| JP | 2003-529135 | 9/2003 |
| JP | 2004-127127 | 4/2004 |
| JP | 2004-130119 | 4/2004 |
| JP | 2004-513409 | 4/2004 |
| WO | WO 99/53686 | 10/1999 |
| WO | WO 00/25876 | 5/2000 |
| WO | WO 00/32286 | 6/2000 |
| WO | WO 2000/064173 | 10/2000 |
| WO | WO 2001/041025 | 6/2001 |
| WO | WO 2001/083058 | 11/2001 |
| WO | 2002/027675 | 4/2002 |
| WO | WO 02/082359 | 10/2002 |
| WO | WO 02/098525 | 12/2002 |

OTHER PUBLICATIONS

U.S. PTO Notice of Allowance for U.S. Appl. No. 11/021,848; 8 pages; dated Apr. 18, 2006.

U.S. PTO Office Action for U.S. Appl. No. 11/021,848; 8 pages; dated Aug. 8, 2006.

U.S. PTO Notice of Allowance for U.S. Appl. No. 11/021,848; 7 pages; dated Jan. 30, 2007.

U.S. PTO Notice of Allowance for U.S. Appl. No. 11/021,848; 4 pages; dated Jul. 27, 2007.

PCT International Search report and Written Opinion for PCT Application No. PCT/US05/46932; 8 pages; dated May 19, 2006.

U.S. PTO Office Action for U.S. Appl. No. 10/879,972; 1 page; dated Mar. 4, 2008.

PCT Search Report and Written Opinion for International Application No. PCT/US05/22951; 10 pages; dated Mar. 7, 2008.

U.S. PTO Office Action for U.S. Appl. No. 11/927,203; 15 pages; dated Mar. 10, 2008.

U.S. PTO Office Action for U.S. Appl. No. 11/927,240; 15 pages; dated Mar. 19, 2008.

http://web.archive.org/web/20040204172258/http://intrade.com, published Feb. 4, 2004, accessed Oct. 2, 2008, All.

(56) References Cited

OTHER PUBLICATIONS

U.S. PTO Office Action for U.S. Appl. No. 11/201,830; 12 pages; dated Oct. 9, 2008.
U.S. PTO Office Action for U.S. Appl. No. 11/927,240; 10 pages; dated Oct. 29, 2008.
U.S. PTO Office Action for U.S. Appl. No. 11/927,240; 10 pages; 8/15/8.
U.S. PTO Office Action for U.S. Appl. No. 10/879,972; 14 pages; dated Jan. 9, 2009.
U.S. PTO Office Action for U.S. Appl. No. 11/927,203; 10 pages; dated Mar. 10, 2009.
PCT Written Opinion for International Application No. PCT/US06/19619; dated May 5, 2008; 5 pages.
PCT Search Report for International Application No. PCT/US05/46932; dated May 19, 2006; 2 pages.
PCT Written Opinion for International Application No. PCT/US05/46932; dated May 19, 2006; 4 pages.
PCT Search Report and Written Opinion for International Application No. PCT/US09/32202; 11 pages; dated Mar. 13, 2009.
Supplemental European Search Report for EP Application No. 05762607.9; 4 pages; dated Feb. 1, 2010.
U.S. PTO Office Action for U.S. Appl. No. 10/879,972; 13 pages; dated Mar. 1, 2010.
U.S. PTO Office Action for U.S. Appl. No. 11/927,203; 11 pages; dated Mar. 2, 2010.
AU Examination Report for Application No. 2005319040; dated Jun. 22, 2010; 2 pages.
EP Search Report for Application No. 05855484.1; dated Sep. 21, 2010; 6 pages.
NZ Examination Report for Application No. 552344; dated Sep. 23, 2010; 2 pages.
Notice of Acceptance for Application No. 556134; dated Dec. 20, 2010; 1 pages.
U.S. PTO Office Action for U.S. Appl. No. 11/201,830 dated Feb. 15, 2011; 11 pages.
Pre Brief Appeal Conference Decision for U.S. Appl. No. 11/927,240; dated Apr. 28, 2010; 2 pages.
U.S. PTO Office Action for U.S. Appl. No. 11/927,203; 12 pages; dated Nov. 22, 2010.
U.S. PTO Office Action for U.S. Appl. No. 12/020,838; dated Feb. 17, 2011; 21 pages.
AU Examination Report for Application No. 2005259921; dated Mar. 18, 2010; 2 pages.
EP Office Action for Application No. 05762607.9; dated Oct. 8, 2013; 7 pages.
Notice of Acceptance for Application No. 563474; dated Jul. 6, 2009; 2 pages.
AU Examination Report for Application No. 2006247029; dated Oct. 18, 2010; 3 pages.
JP Office Action for Application No. 2008-512573; dated Aug. 29, 2011; 5 pages (including English Translation).
U.S. PTO Office Action for U.S. Appl. No. 11/927,203; dated Aug. 2, 2011; 14 pages.
U.S. PTO Office Action for U.S. Appl. No. 10/879,972; dated May 13, 2011; 16 pages.
Notice of Panel Decision for U.S. Appl. No. 11/201,830; 2 pages; dated Sep. 14, 2011.
U.S. PTO Office Action for U.S. Appl. No. 12/020,838; dated Nov. 9, 2011; 9 pages.
JP Office Action for Application No. 2007-518372; dated Aug. 30, 2011; 7 pages (including English Translation).
Notice of Allowance for U.S. Appl. No. 11/927,240; dated Nov. 23, 2011; 6 pages.
U.S. PTO Office Action for U.S. Appl. No. 11/201,830; dated Nov. 25, 2011; 10 pages.
Notice of Panel Decision for U.S. Appl. No. 10/879,972; 2 pages; dated Jan. 20, 2012.
U.S. PTO Office Action for U.S. Appl. No. 10/879,972; 11 pages; dated Mar. 21, 2012.
Notice of Allowance for U.S. Appl. No. 11/927,203; dated Apr. 11, 2012; 10 pages.
Ford, The Quiet Man, Republic Pictures, 1952.
JP Office Action for Application No. 2007-548562; dated Nov. 8, 2011; 7 pages (includes English Translation).
Notice of Allowability for U.S. Appl. No. 11/927,203; dated May 1, 2012; 5 pages.
Notice of Acceptance for AU Application No. 2005319040; dated Mar. 13, 2012; 3 pages.
Extended Search Report for EP Application No. 06760231.8; dated Mar. 23, 2012; 8 pages.
Notice of Allowance for U.S. Appl. No. 12/020,838; 6 pages; dated Apr. 16, 2012.
U.S. PTO Office Action for U.S. Appl. No. 11/201,830; dated Jul. 20, 2012; 4 pages.
JP Office Action for Application No. 2008-512573; dated Jul. 25, 2012; 3 pages (including English Translation).
Notice of Allowance for U.S. Appl. No. 10/879,972; 5 pages; dated Dec. 18, 2012.
EP Communication Pursuant to Article 94(3) EPC for Application No. 05855484.1; 5 pages; dated Oct. 17, 2012.
Australian Examination Report for Application No. 2011254023; 3 Pages; dated Dec. 14, 2012.
JP Office Action for Application No. 2007-518372; dated Oct. 2, 2012; 4 pages (including English Translation).
JP Decision to Grant a Patent for Application No. 2008-512573; dated Jan. 9, 2013; 5 pages (including English Translation).
CA Examiner's Report for Application No. 2,592,033; dated Feb. 11, 2013; 4 pages.
EP Extended Search Report for Application No. 12005538.9; dated Feb. 4, 2013; 7 pages.
Notice of Allowance for U.S. Appl. No. 10/879,972; 9 pages; dated Mar. 22, 2013.
Notice of Allowance for U.S. Appl. No. 11/201,830; 9 pages; dated Mar. 22, 2013.
Corrected Notice of Allowability for U.S. Appl. No. 11/201,830; 2 pages; dated May 1, 2013.
Australian Examination Report for Application No. 2012205192; 2 Pages; dated Jun. 18, 2013.
U.S. Office Action for U.S. Appl. No. 13/488,413; 5 pages; dated Nov. 12, 2013.
EP Examination Report for App. No. 05855484.4; dated Dec. 13, 2013; 6 pages.
JP Office Action for App. No. 2012-021177; dated Nov. 26, 2013; 21 pages (w/English translation).
CA Examiner's Requisition for App. No. 2,572,219; dated Aug. 23, 2013; 2 pages.
EP Examination Report for App. No. 12005538.9; dated Feb. 4, 2014; 4 pages.
JP Office Action for App. No. 2007-518372; dated Jul. 30, 2013; 5 pages (w/English translation).
U.S. Office Action for U.S. Appl. No. 13/617,299; 6 pages; dated Nov. 25, 2013.
CA Examiner's Requisition for App. No. 2,607,423; dated Jun. 28, 2013; 3 pages.
EP Examination Report for App. No. 06760231.8; dated Jan. 27, 2014; 5 pages.
U.S. Office Action for U.S. Appl. No. 13/589,283; dated Mar. 20, 2014; 6 pages.
U.S. Notice of Allowance for U.S. Appl. No. 13/488,413; 5 pages; dated May 21, 2014.
U.S. Final Office Action for U.S. Appl. No. 13/617,299; 5 pages; dated Jun. 2, 2014.
CA Examiner's Requisition for App. No. 2,592,033; dated Aug. 25, 2014; 2 pages.
CA Examiner's Requisition for App. No. 2,592,033; dated Nov. 2, 2015; 4 pages.
EP Summons to Oral Proceedings for Application No. 05855484.1; 8 pages; Jul. 8, 2015.
JP Office Action for App. No. 2012-021177; dated Dec. 8, 2015; 8 pages (w/English translation).
AU Examination Report for Application No. 2014224149; dated Jul. 31, 2015 (2 pages).

(56) References Cited

OTHER PUBLICATIONS

AU Examination Report for Application No. 2014224149; dated Nov. 27, 2015 (3 pages).
CA Examiner's Requisition for App. No. 2,572,219; dated Jul. 13, 2015; 3 pages.
JP Office Action for App. No. 2007-518372; dated Sep. 2, 2013; 13 pages (w/English translation).
Notice of Acceptance for AU Application No. 2012205192; dated Mar. 30, 2015; 2 pages.
CA Examiner's Requisition for App. No. 2,607,423; dated Sep. 15, 2014; 3 pages.
CA Examiner's Requisition for App. No. 2,607,423; dated Aug. 13, 2015; 4 pages.
EP Decision to Refuse for Application No. 05855484.1; 4 pages; dated Jan. 26, 2016.
CA Examiner's Requisition for App. No. 2572219; dated Aug. 31, 2016; 6 pages.
AU First Examiner's Report for App. No. 2015201379; dated Oct. 21, 2016; 4 pages.
CA Notice of Allowance for App. No. 2592033; dated Nov. 23, 2016; 2 pages.
JP Office Action for App. No. 2016-078410; dated Mar. 14, 2017; 6 pages (w/English translation).
AU Examination Report for Application No. 2016208446; dated Jun. 15, 2017 (3 pages).
AU Second Examiner's Report for App. No. 2015201379; dated Sep. 4, 2017; 5 pages.
CA Examiner's Final Requisition for App. No. 2,607,423; dated Sep. 18, 2017; 6 pages.
EP Summons to Attend Oral Hearings for Application No. 6760231.8; 8 pages; May 22, 2017.
EP Decision to Refuse for Application No. 6760231.8; 4 pages; dated Nov. 23, 2017.
CA Examiner's Requisition for App. No. 2572219; dated Oct. 25, 2017; 6 pages.
CA Examiner's Requisition for App. No. 2969147; dated Apr. 3, 2018; 4 pages.
EP Summons to Attend Oral Proceedings for Application No. 12005538.9; 7 pages; Oct. 16, 2017.
CA Patent Appeal Board Notice for App. No. 2,572,219; Sep. 13, 2018; 6 pages.
AU First Examiner's Report for App. No. 2017248475; dated Nov. 23, 2018; 5 pages.

| SELECTED HORSES | INTERMEDIATE POINT/FINISH LINE ||||||||
|---|---|---|---|---|---|---|---|---|
| | 104a | 104b | 104c | 104d | 104e | 104f | 104g | 108 |
| HORSE # 1 | 2 | 2 | 4 | 3 | 4 | 3 | 3 | 1 |
| HORSE # 4 | 7 | 6 | 9 | 10 | 7 | 5 | 4 | 5 |
| HORSE # 6 | 12 | 10 | 7 | 8 | 8 | 7 | 9 | 11 |

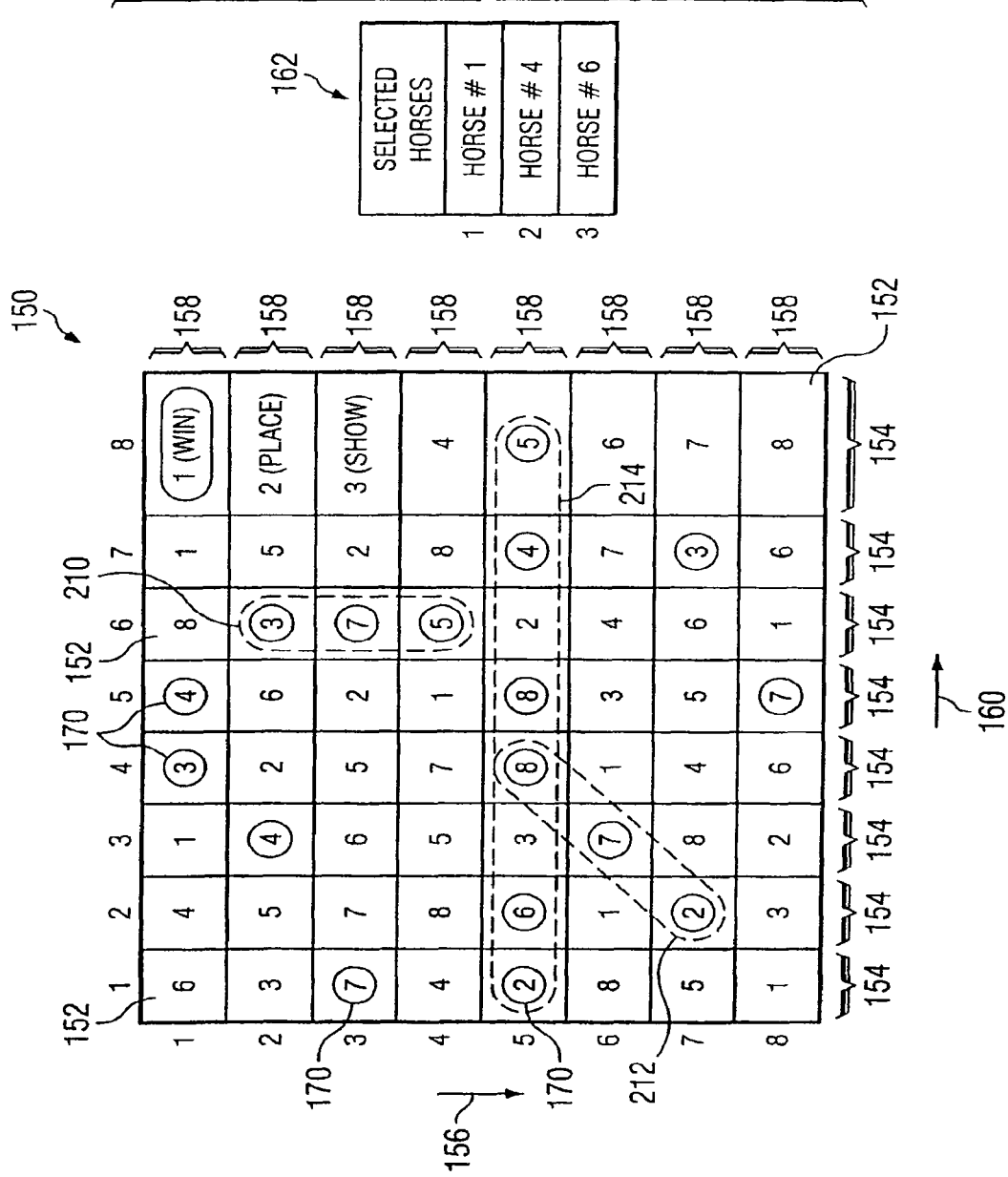

SYSTEM AND METHOD FOR GAMING BASED UPON INTERMEDIATE POINTS IN A RACE EVENT

CROSS REFERENCE TO RELATED APPLICATIONS

This application is a continuation of U.S. patent application Ser. No. 15/876,997 filed on Jan. 22, 2018, which is a continuation of U.S. patent application Ser. No. 15/350,608 filed on Nov. 14, 2016 (now U.S. Pat. No. 9,875,619), which is a continuation of U.S. patent application Ser. No. 13/589,283 filed on Aug. 20, 2012 (now U.S. Pat. No. 9,492,735), which is a continuation of U.S. patent application Ser. No. 12/020,838 filed on Jan. 28, 2008, now U.S. Pat. No. 8,246,432 issued on Aug. 21, 2012, all of which are hereby incorporated by reference.

BRIEF DESCRIPTION OF THE DRAWINGS

For a more complete understanding of the present invention and for further features and advantages, reference is now made to the following description, taken in conjunction with the accompanying drawings, in which:

FIG. 3 illustrates an example two-dimensional bet matrix that at least partially defines one or more bet components of an interval bet in accordance with an embodiment of the present invention;

DETAILED DESCRIPTION

Figure 1:
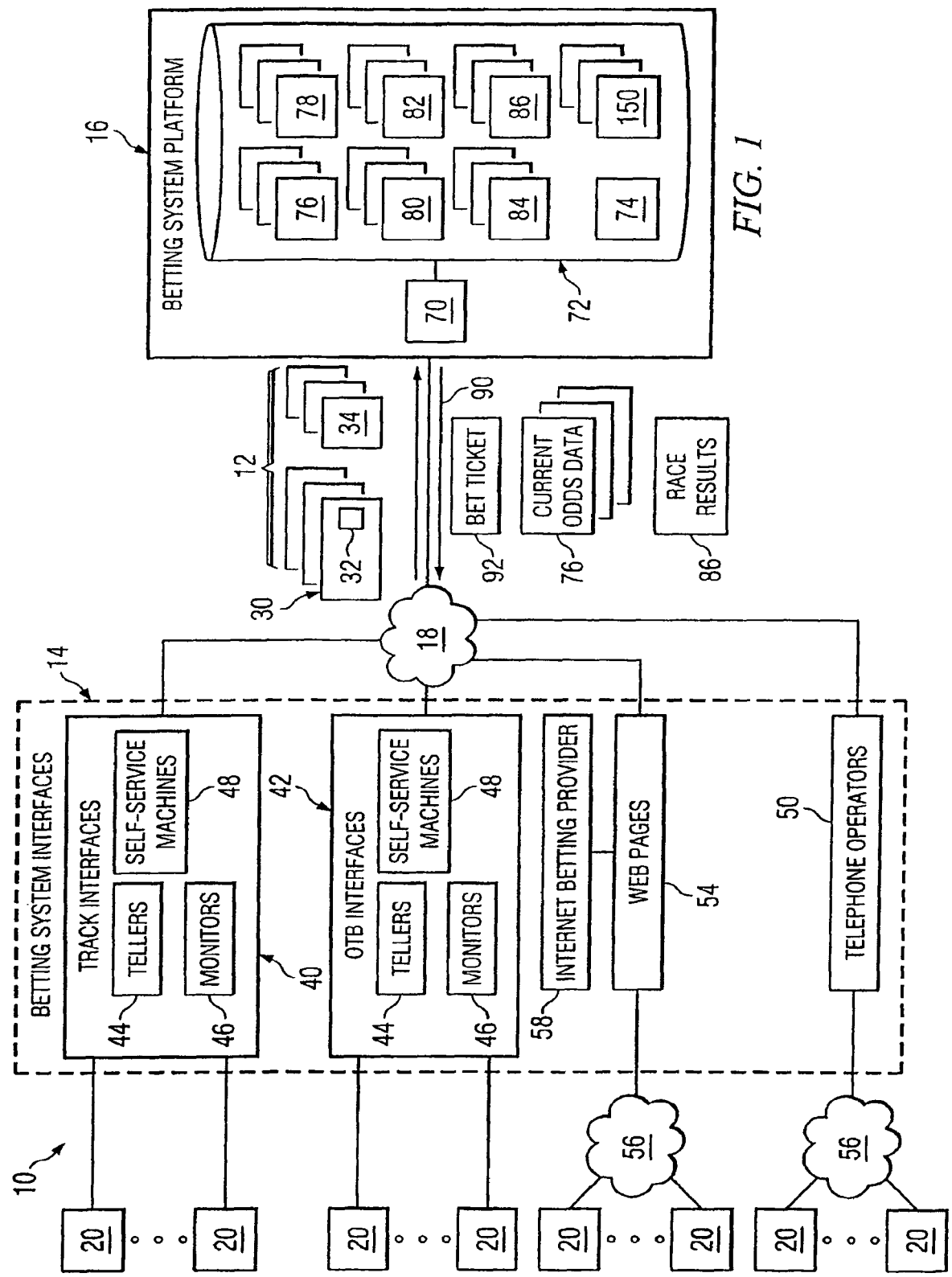
FIG. 1 illustrates an example system for providing and managing interval bets regarding intermediate points in a race event in accordance with an embodiment of the present invention.

The following sections I-X provide a guide to interpreting the present application.

I. Terms

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" do not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

II. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

III. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

IV. Disclosed Examples and Terminology are not Limiting

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. § 1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

All words in every claim have the broadest scope of meaning they would have been given by a person of ordinary skill in the art as of the priority date. No term used in any claim is specially defined or limited by this application except where expressly so stated either in this specification or in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial online service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In some embodiments, a server computer and one or more client computers may perform desired actions. Actions may be performed by one or more of the clients and/or servers in accordance with a desired distribution of labor. Such distribution of labor may be made based on where the actions may be performed more securely, more quickly, and/or more cost-effectively. For example, in some implementations, complex calculations may be performed by a central server to increase speed, display related calculations may be performed by a client because they may be simple, outcome determining calculations may be performed by a central server in order to ensure the validity of the calculations and allow tweaking of odds to be performed at a single location. It should be recognized that any desired actions may be divided among a server and any number of clients in any desired way.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. § 112, Paragraph 6

In a claim, a limitation of the claim which includes the phrase "means for" or the phrase "step for" means that 35 U.S.C. § 112, paragraph 6, applies to that limitation.

In a claim, a limitation of the claim which does not include the phrase "means for" or the phrase "step for" means that 35 U.S.C. § 112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. § 112, paragraph 6, applies to that step(s).

With respect to a means or a step for performing a specified function in accordance with 35 U.S.C. § 112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. § 112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function hat is a method, one structure for performing this method includes a computing device (e.g., a general purpose computer) that is programmed and/or configured with appropriate hardware to perform that function.

Also includes a computing device (e.g., a general purpose computer) that is programmed and/or configured with appropriate hardware to perform that function via other algorithms as would be understood by one of ordinary skill in the art.

VIII. Disclaimer

Numerous references to a particular embodiment does not indicate a disclaimer or disavowal of additional, different embodiments, and similarly references to the description of embodiments which all include a particular feature does not indicate a disclaimer or disavowal of embodiments which do not include that particular feature. A clear disclaimer or disavowal in the present application shall be prefaced by the phrase "does not include" or by the phrase "cannot perform".

IX. Incorporation By Reference

Any patent, patent application or other document referred to herein is incorporated by reference into this patent application as part of the present disclosure, but only for purposes of written description in accordance with 35 U.S.C. § 112, paragraph 1 and enablement in accordance with 35 U.S.C. § 112, paragraph 1, and should in no way be used to limit, define, or otherwise construe any term of the present application where the present application, without such incorporation by reference, would not have failed to provide an ascertainable meaning, but rather would have allowed an ascertainable meaning for such term to be provided. Thus, the person of ordinary skill in the art need not have been in any way limited by any embodiments provided in the reference Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

X. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

XI. Example Embodiments

Some Embodiments relate in general to betting on events and, more particularly, to a system and method for gaming based upon intermediate points in a race event.

Wagering on sporting events, such as horse races, for example, is a large and growing industry in many parts of the world. Various types of betting products or systems are available for various types of sporting events For example, typical horse racing bets allow bettors to bet on the finishing position of a single horse or several horses in a particular race or series of races. For instance, a bettor can bet on a particular horse to finish first (win), finish in the top two (place), or finish in the top three (show). A bettor may also make various combination bets with multiple horses, such as an exacta bet (covering the top two finishing horses in order)

or a trifecta bet (covering the top three finishing horses in order). In addition, a bettor may bet on a series of races, such as the daily double (winners of two consecutive races), the pick-three (winners of three consecutive races), and the pick-six (winners of six consecutive races), for example.

In a pari-mutuel betting system, all bets regarding a particular event are aggregated, a commission (or "takeout") is taken by the track, and the remainder is distributed among the winning bettors. For example, pari-mutuel betting systems are commonly used in North America (and other various places throughout the world) for betting on horse races.

According to one embodiment, a method of gaming is provided that comprises receiving a determination of a particular race participant in a race event having a plurality of race participants. The method continues by determining a particular position of the particular race participant at each of a plurality of intermediate points within the race event. The method continues by determining a plurality of simulated playing cards based at least in part upon the determined positions of the particular race participant. The method concludes by determining an outcome of a game based at least in part upon the determined simulated playing cards.

According to another embodiment, a method of providing and managing bets is provided. One or more particular race participants in a race event are determined. For each intermediate point within a race event, one or more particular possible positions of race participants at that intermediate point is determined. A bet comprising a plurality of bet components is generated, one or more of the bet components being defined by the particular race participants and the particular possible positions of race participants determined for at least one of the intermediate points. Intermediate race results are received for each intermediate point identifying the actual positions of the particular race participants at that intermediate point. A result of at least one bet component is determined based on the particular race participants, the particular possible positions of race participants determined for at least one intermediate point, and the received intermediate race results for at least one intermediate point.

According to another embodiment, another method of providing and managing bets is provided. A bet identifying one or more particular race participants in a race event is received. The bet regards the positions of the one or more particular race participants at one or more intermediate points within the race event. Intermediate race results identifying the positions of each of the one or more particular race participants at the one or more intermediate points are received, and a result of the bet is determined based at least in part on the received intermediate race results.

According to yet another embodiment, another method of providing and managing bets is provided. A determination of one or more particular race participants in a race event having a plurality of race participants is received. A bet matrix is generated, which includes a plurality of columns extending in a first direction and a plurality of rows extending in a second direction, each column corresponding with one of a plurality of intermediate points in a race event. For each of a plurality of intermediate points within the race event, one or more particular possible positions of race participants at that intermediate point are determined. Each column in the bet matrix is populated with entries identifying the one or more possible positions determined for the intermediate point corresponding with that column. A bet associated with the bet matrix is provided and includes one or more bet components. At least one of the bet components is defined at least in part by (a) at least one of the one or more particular race participants and (b) the arrangement of the numbers within one or more columns of the bet matrix.

Intermediate race results for each of the plurality of intermediate points are received which identify the race participants that were actually positioned in each of the one or more possible positions determined for that intermediate point. Matched entries (if any) are identified within the bet matrix based on the received intermediate race results. A matched entry is a matrix entry that identifies a possible position in which one of the particular race participants was actually positioned at the intermediate point corresponding with the column in which that matrix entry is located. The result for each bet component is determined based at least in part on the relative locations of each of the determined matched entries within the bet matrix. For example, particular bet components may require a particular number of matched entries aligned consecutively in a single direction (such as horizontally, vertically, or diagonally) within the bet matrix.

Various embodiments of the present invention may benefit from numerous advantages. It should be noted that one or more embodiments may benefit from some, none, or all of the advantages discussed below.

One advantage of the invention is that bets may be offered regarding the positions of particular race participants (such as horse or dogs, for example) at one or more intermediate points in a race event (such as a horse race or dog race, for example). Thus, more betting events and types of bets are available to customers for each race event. In addition, some bettors may place interval bets on race events when they would not have otherwise placed traditional bets on the event. This may increase the total pool of wagers on the race event, which may increase the purses offered for race events and/or the profits of the entities that collect a commission or take-out from such wagers. Another advantage of the invention is that such interval bets may be provided in a pari-mutuel betting system in which all bets regarding a particular event are pooled.

Another advantage of the invention is that timing and/or recording devices may be located at intermediate points along a race track in order to determine the positions of race participants at such intermediate points. As discussed above, this positional information may then be used as input for determining the results of various bet components of interval bets. In addition, a computerized system may generate a bet matrix for an interval bet, which may be printed on a bet ticket and provided to the customer placing the interval bet. By using such a computerized system, bet matrices may be generated nearly instantaneously, including populating at least a portion of such bet matrices with randomly generated entries. Moreover, the computational power of a computerized system can be used to generate and process sophisticated, multi-dimensional bet matrices that may be difficult to perform otherwise. Each bet matrix may at least partially define various bet components of an interval bet such that the customer may track the progress and/or results of the various bet components.

Other advantages will be readily apparent to one having ordinary skill in the art from the following figures, descriptions, and claims.

FIG. 1 illustrates an example system 10 for providing and managing interval bets regarding intermediate points in a race event in accordance with an embodiment of the present invention. System 10 includes one or more betting system interfaces 14 and a betting system platform 16 coupled by one or more communications networks 18. In general, one or more customers 20 may receive betting information (such as event times, betting rules, betting options and odds, for example) and/or place bets 12 via betting system interfaces 14. In some embodiments, bets 12 are received by betting system interfaces 14 and communicated to betting system platform 16. Betting system platform 16 may then store the received bets 12, determine appropriate odds, bet results and payouts, and communicates such odds, bet results and payouts to one or more of the betting system interfaces 14.

System 10 permits customers 20 to place interval bets 30 on a race event having a group of race participants, such as a horse race, dog race, or auto race, for example. In some embodiments, each interval bet 30 may include one or more bet components 32, each comprising a bet regarding the positions of one or more particular race participants at one or more intermediate points in the race event and/or at the finish of the race event. Thus, a particular interval bet 30 may in fact comprise a number of different bets. For instance, in a one-mile horse race, an example interval bet 30 may include a first bet component 32a regarding whether Horse #3 will be in 5th place at the ¼ mile point of the race; a second bet component 32b regarding whether Horse #3 will be in 2nd place at the ½ mile point of the race; a third bet component 32c regarding whether Horse #3 will be in 7th place at the ¾ mile point of the race; and a fourth bet component 32d regarding whether Horse #3 will be in 1st place at the finish line (i.e., the 1 mile point) of the race. Interval bets 30 and bet components 32 of interval bets 30 are described below in greater detail.

In some embodiments, system 10 may also permit customers 20 to place traditional bets 34 in addition to interval bets 30. Traditional bets 34 may include bets such as win bets, place bets, show bets, exacta bets, trifecta bets, wheel bets, box bets, daily double bets, and pick-six bets, among others, for example. In some embodiments, a customer 20 may place one or more traditional bets 34 and one or more interval bets 30 on the same race event or group of race events.

Odds and/or payouts for bets 12 provided by system 10 (including interval bets 30 and/or traditional bets 34) may be determined in any suitable manner. For example, odds and/or payouts for some bets 12 provided by system 10 may be determined according to a pari-mutuel system in which the wager amounts for a group of bets 12 (such as a particular type of bet 12 or bets 12 regarding a particular race event, for example) are pooled, a commission (or "take-out") is taken by the track or other wagering provider, and the remainder is distributed among the winning bettors. Alternatively, odds and/or payouts for some bets 12 provided by system 10 may be determined according to some other system, such as a betting system in which customers 20 take positions against a bookmaker, for example. For some bets 12, predetermined or fixed odds may be determined and communicated to customers 20.

In particular, bet components 32 for interval bets 30 may be determined in a pari-mutuel manner, using predetermined or fixed odds, or in any other suitable manner Certain interval bets 30 may include one or more pari-mutuel bet components 32 (bet components 32 whose odds and/or payouts are determined in a pari-mutuel manner) and one or more bet components 32 whose odds and/or payouts are otherwise determined (such as based on fixed odds). In some embodiments, a separate pari-mutuel pool is provided for each type of pari-mutuel bet component 32 included in an interval bet 30. The wager amounts for each type of pari-mutuel bet component 32 included in an interval bet 30 placed by one customer 20 may then be pooled with the wager amounts for the same type of bet component 32 of interval bets 30 placed by other customers 20. In addition, a different set of pari-mutuel pools may be provided for each race event. In some embodiments, when there are no winning bet components 32 in a particular pari-mutuel pool, the wager amounts in that pool may be returned to the customers 20, carried over to a new pari-mutuel pool for a subsequent race, or otherwise managed.

Betting system interfaces 14 may include any suitable interface between a customer 20 and betting system platform 16. For example, as shown in FIG. 1, betting system interfaces 14 may include physical interfaces, such as track interfaces 40 and/or off-track interfaces 42. Track interfaces 40 are generally located at a track, while off-track interfaces 42 are generally located at an off-track-betting (OTB) establishment, such as an OTB parlor. Track interfaces 40 and off-track interfaces 42 may include tellers 44, which may receive bets 12 from and distribute payouts to customers 20, and/or monitors 46, which may be viewed by customers 20 to monitor betting information such as the event time, the current odds, and the projected or actual payouts for various bets 12, for example. In some situations, such information may be updated substantially in real time or at preset intervals (such as every 30 seconds or after each intermediate point in the race event, for example) as new bets 12 are placed and/or as information regarding the event changes, for example. Monitors 46 may include, for example, toteboards or closed-circuit televisions located at a track or OTB establishment.

Track interfaces 40 and/or off-track interfaces 42 may also include one or more self-service betting machines 48. In some embodiments, self-service betting machines 48 allow customers 20 to insert payment into the machine (such as cash or by using a voucher or a credit or debit card), place one or more interval bets 30 and/or traditional bets 34, and receive a printout (such as a ticket, for example) indicating the bet or bets placed. Printouts for winning bets may be inserted into the self-service betting machine, such as to receive a payment voucher (which may be used to receive a payout from a teller 44) or to place additional bets 12. In other embodiments, self-service betting machines 48 allow customers 20 to use a credit or debit card to place bets 12. The credit or debit card may have an associated account, which may be a betting account provided and/or managed by a betting account provider. In some embodiments, after the race event is completed, a customer 20 may insert or swipe his or her credit or debit card in the self-service betting machines 48 in order to update the balance on the card. Self-service betting machines 48 may also allow the customer 20 to print out payment vouchers which may be presented to a teller 44 in order to receive payments.

As shown in FIG. 1, betting system interfaces 14 may also include various non-physical interfaces, such as one or more telephone operators 50 and one or more web pages 54. Customers 20 may access or communicate with such non-physical interfaces via one or more communications networks 56. Communications networks 56 may include one or more servers, routers, switches, repeaters, backbones, links and/or any other appropriate type of communication devices coupled by links such as wire line, optical, wireless, or other appropriate links. In general, communication network 56 may include any interconnection found on any communication network, such as a telephone network, a local area network (LAN), metropolitan area network (MAN), wide area network (WAN), the Internet, portions of the Internet, or any other data exchange system. To access betting system interface 14 using communication networks 56, customers 20 may use a computer, a personal digital assistant (PDA), a cell-phone, a remote paging device, an electronic mail communication device, a handheld betting device, or any other suitable mobile device. In certain embodiments, customers 20 may receive any suitable information, such as betting information, from betting system platform 16 via mobile devices using, for example, communication networks 56 and betting system interfaces 14.

Telephone operators 50 may communicate betting information (such as event times, betting rules, betting options and odds, for example) to, and take bets 12 from, customers 20. Similarly, web pages 54 may communicate betting information to customers 20 and allow customers 20 to place bets 12. One or more of such web pages 54 may be hosted by one or more servers associated with system 10, which server or servers may also host betting system platform 16 in some embodiments. In some embodiments, betting information available to customers 20 via web pages 54 may be updated substantially in real time or at preset intervals (such as every 30 seconds, for example) as new bets 12 are placed and/or as information regarding the event changes, for example.

In some embodiments, one or more web pages 54 may be provided by, or associated with, an Internet betting provider 58, for example. Internet betting provider 58 may provide Internet account wagering by providing online betting accounts to one or more customers 20. Using an online betting account, a customer 20 may interface with one or more web pages 54 associated with the Internet betting provider 58 in order to fund the account, view betting information regarding race events, and place bets 12 (such as interval bets 30 and/or traditional bets 34). Such online betting accounts may include one or more various types of accounts, such as deposit accounts, credit accounts, stop-loss accounts, and hybrid accounts, for example.

Some or all of the betting system interfaces 14 of system 10 may be operable to offer or receive both interval bets 30 and traditional bets 34. However, in some embodiments, one or more betting system interfaces 14 may only offer or receive either interval bets 30 or traditional bets 34. For example, in a particular embodiment, a set of web pages associated with betting system platform 16 may allow customers 20 to place both interval bets 30 and traditional bets 34, while a particular self-service betting machine 48 may only allow customers 20 to place interval bets 30, or vice versa.

As discussed above, betting system platform 16 is operable to receive bets 12 (including both interval bets 30 and traditional bets 34) from betting system interfaces 14, store the received bets 12, determine appropriate odds, bet results and payouts, and communicate such odds, bet results and/or payouts to one or more of the betting system interfaces 14, which may then display such odds, bet results and/or payouts to customers 20. As shown in FIG. 1, betting system platform 16 includes a processor 70 coupled to a memory 72. Processor 70 is generally operable to execute a betting system software application 74 or other computer instructions to determine current odds data 76, bet results 78, and payouts 80, which are discussed below in greater detail.

As discussed above, betting system platform 16 comprises processor 70 and memory 72. Processor 70 may comprise any suitable processor that executes betting system software application 74 or other computer instructions, such as a central processing unit (CPU) or other microprocessor, and may include any suitable number of processors working together. Memory 72 may comprise one or more memory devices suitable to facilitate execution of the computer instructions, such as one or more random access memories (RAMs), read-only memories (ROMs), dynamic random access memories (DRAMs), fast cycle RAMs (FCRAMs), static RAM (SRAMs), field-programmable gate arrays (FPGAs), erasable programmable read-only memories (EPROMs), electrically erasable programmable read-only memories (EEPROMs), or any other suitable volatile or non-volatile memory devices.

Memory 72 is generally operable to store various information that may be used by processor 70 in determining odds, bet results and/or payouts. For example, memory 72 may comprise any suitable number of databases, which may be co-located or physically and/or geographically distributed. In the example shown in FIG. 1, memory 72 may store any or all of the following: betting system software application 74, current odds data 76, bet results 78, payouts 80, race event parameters 82, bet parameters 84, race results 86, and bet matrices 150.

Current odds data 76 may include current or near-current data regarding, for example, (a) the wager amounts stored in pari-mutuel pools for various bets 12 (including interval bets 30, bet components 32 and/or traditional bets 34), (b) current odds data for various bets 12 (whether such bets 12 are pari-mutuel or fixed odds bets), and/or (c) potential payout data for various bets 12, such that customers 20 may determine the potential payouts for bets 12 based on the wager amounts of such bets 12. As discussed above, processor 70 is operable to execute betting system software application 74 to determine such current odds data 76. Processor 70 may determine such current odds data 76 based at least on data received from memory 72 and/or one or more betting system interfaces 14. In addition, processor 70 may update such current odds data 76 based on new information being received by betting system platform 16. In some embodiments, processor 70 may update current odds data 76 in real time, substantially in real time, or at preset intervals (such as every 30 seconds, for example).

As shown in FIG. 1, current odds data 76 may be communicated to one or more betting system interfaces 14 via communications network 18, as indicated by arrow 90. Current odds data 76 may then be made available to customers 20, such as via tote boards or monitors 46 located at a track or OTB establishment, for example, or in appropriate web page(s) 54 that may be accessed by customers 20, for example. In this manner, customers 20 may have access to real-time or substantially real-time current odds data 76 regarding various bets 12 or race events.

Bet results 78 may comprise various data regarding the results of various bets 12 (including interval bets 30, bet components 32 and/or traditional bets 34), such as the identity of the customer 20 who placed the bet 12, the result of the bet, the determined payout 80 for the bet 12 and/or whether the payout 80 was distributed to the customer 20, for example. Possible results for a bet 12 may include, for example, "win," "lose," "push," or "no action." Processor 70 may determine such results for a bet 12 based on race event parameters 82 regarding one or more relevant race events, bet parameters 84 regarding the bet 12, race results 86 regarding one or more relevant race events (which may include the positions of various race participants at each intermediate point 104 and at the finish line 108 of the race as illustrated, for example, in FIG. 2), and bet matrices 150 generated by betting system platform 16.

Processor 70 may determine payouts 80 for each winning bets 12 based on various data depending on whether the bet 12 is a pari-mutuel, fixed-odds, or other type of bet. Processor 70 may determine payouts 80 for winning pari-mutuel and fixed-odds bets 12 according to known methods for determining payouts for such types of bets. It should be understood that the payouts 80 determined by betting system platform 16 may comprises potential payouts and profits, which may be calculated and/or updated dynamically prior to the race, or actual payouts and profits, which may be calculated after betting on the race has been closed, or after the race has been run and/or declared "official."

Race event parameters 82 may comprise various parameters of one or more race events, such as, for example, the type of race event, the time, date and location of the race event and/or the number (or in some cases, the name) of each of the participants in the race event.

Bet parameters 84 may comprise various parameters of one or more received bets 12 (including interval bets 30, bet components 32 and/or traditional bets 34), such as the identity of the customer 20 who placed the bet 12, the manner in which the bet 12 was placed (such as via telephone, the Internet, or in person at a track or OTB establishment, for example), the type of bet 12 (such as whether the bet 12 is an interval bet 30 or a traditional bet 34, for example), the commission rate on the bet 12, the particular participants determined (for example, selected by the customer 20 or determined by betting system platform 16 randomly, based on previous race results, or based on the participants determined for other customer's bets 12 and/or the wager amounts of such other bets, or otherwise determined) for an interval bet 30, and/or the wager amount of the bet 12.

Race results 86 may comprise various data regarding the results of one or more race events, such as the position of each participant at various intermediate points and at the finish line of a race, whether there was a tie for any position and/or whether any participants did not finish the event, for example. Race results 86 may be received from various intermediate point recording devices and finish line recording devices located around a racetrack, as discussed in greater detail below with reference to FIG. 2.

Bet matrices 150 may define various bet components 32 of an interval bet 30. Bet matrices 150 may by generated by betting system platform 16 based on various inputs, such as race event parameters 82 regarding one or more race events and particular bet parameters 84 (which may be selected by a customer 20 or determined by betting system platform 16), for example. In some embodiments, betting system platform 16 may populate (or fill in) at least a portion of a bet matrix 150 with randomly determined numbers representing possible positions of race participants at various intermediate points and/or at the finish line of a race event. In some embodiments, bet matrices 150 are physically printed on bet tickets 92 and given to customers 20 who place interval bets 30 such that a customer 20 may follow the progress of his interval bet 30 and determine the results of the bet components 32 of the interval bet 30. In other embodiments, bet matrices 150 are not physically printed on bet tickets 92. In either embodiment, bet matrices 150 are stored and utilized by betting system platform 16 to define and manage bet components 32. In some embodiments, by using a computerized betting system platform 16, bet matrices 150 may be generated and/or recorded nearly instantaneously, including populating at least a portion of such bet matrices 150 with randomly generated entries.

It should be understood that references herein to making "random" determinations (such as randomly determining numbers for a bet matrix, randomly determining possible positions of race participants, or randomly determining particular race participants for an interval bet 30, for example) includes using a computer (such as a computer associated with betting system platform 16, for instance) to determine "random" or "pseudo-random" numbers using any known or otherwise suitable algorithms or techniques.

As discussed above, one or more communications networks 18 couple and facilitate wireless or wireline communication between one or more betting system interfaces 14 and betting system platform 16. Each communication network 18 may include one or more servers, routers, switches, repeaters, backbones, links and/or any other appropriate type of communication devices coupled by links such as wire line, optical, wireless, or other appropriate links. In general, each communication network 18 may include any interconnection found on any communication network, such as a local area network (LAN), metropolitan area network (MAN), wide area network (WAN), the Internet, portions of the Internet, or any other data exchange system.

It should also be understood that one, some or all of the components of betting system platform 16 may be located together or may be physically or geographically distributed. In addition, one, some or all of the components of betting system platform 16, as well as any wager pools (such as pari-mutuel pools, for example) associated with interval bets 30, may be located at a track at which race events associated with such interval bets 30 are hosted or at any other suitable location, such as at another track or OTB entity, for example. In some embodiments, for example, pari-mutuel pools for particular interval bets 30 (or bet components 32) are hosted by the track at which the race events covered by such bets are occurring. In other embodiments, pari-mutuel pools for particular interval bets 30 (or bet components 32) are hosted by a track or OTB entity separate from the track at which the race events covered by such bets are occurring.

Example Track Configuration

Figures 2, 4:
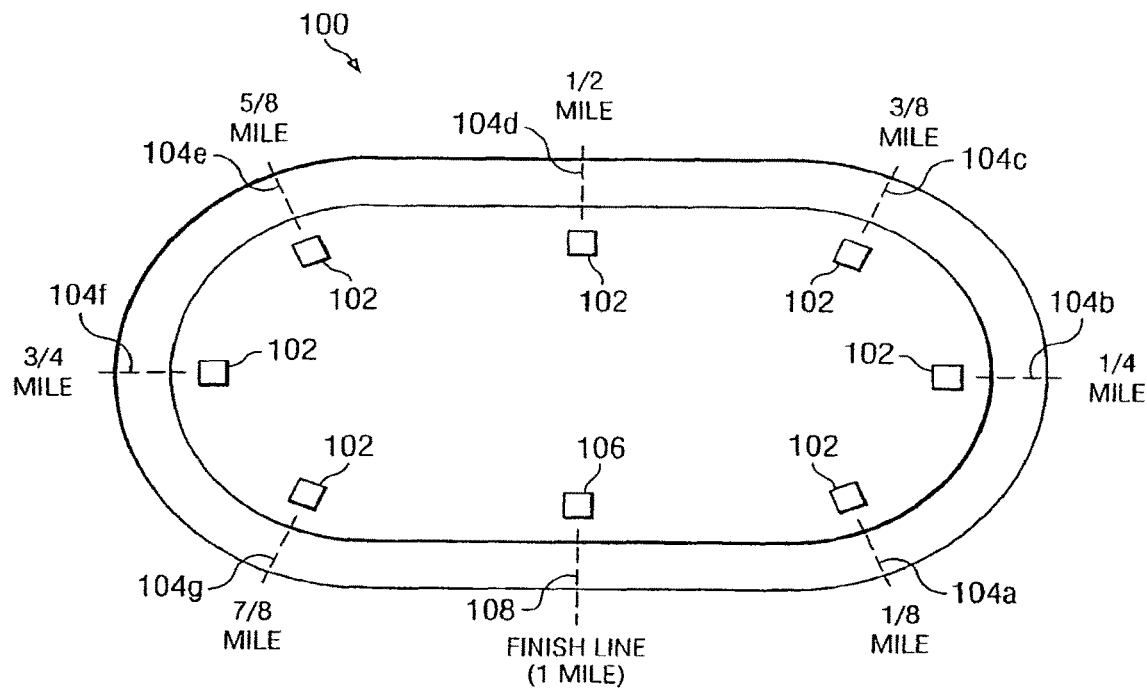
FIG. 2 illustrates an overview of an example race track used in the system of FIG. 1.
FIG. 4 illustrates an example three-dimensional bet matrix that at least partially defines one or more bet components of an interval bet in accordance with an embodiment of the present invention.

FIG. 2 illustrates an overview of a race track 100 for an example race event. Race track 100 may be any suitable length and shape, such as a one-mile oval track, for example. Intermediate point recording devices 102 may be located at each of one or more intermediate points 104 along race track 100, and finish line recording devices 106 may be located at the finish line 108 of race track 100. Intermediate point recording devices 102 and finish line recording devices 106 may comprise any devices suitable for recording the actual positions of race participants as such race participants cross intermediate points 104 and finish line 108. For example, intermediate point recording devices 102 and/or finish line recording devices 106 may include a teletimer, a camera and/or other suitable timing and recording devices. In some embodiments, intermediate point recording devices 102 include timing and recording devices similar to those commonly found at the finish line of race events.

In the example embodiment shown in FIG. 2, track 100 is a one-mile oval track having seven intermediate points 104a-104g, one at each ⅛ mile along track 100 (not counting the finish line 108). Intermediate point recording devices 102 are located at each intermediate point 104a-104g and finish line recording devices 106 are located at the finish line 108. Different numbers of intermediate points 104a-104g may be used for races of various lengths. For example, for a ¾ mile race that begins at intermediate point 104b, the race may include five intermediate points 104 (104c-104g) and the finish line 108. For a one-mile race, the race may include all seven intermediate points 104a-104g and the finish line 108. In races that are longer than one mile (i.e., one full lap around track 100), the finish line 108 may act as an intermediate point 104 as well as the finish line 108. For example, for a 1½ mile race that begins at intermediate point 104d, the race may include intermediate points 104e-104g and finish line 108 acting as an intermediate point 104, and then a full lap including intermediate points 104a-104g and the finish line 108 acting as the finish line of the race. Although particular shapes and lengths are used to provide details regarding an example track 100, it should be understood that in other embodiments, track 100 may have any shape and length, and may include any number of intermediate points 104 arranged in any configuration and at any distance from each other. In this regard, intermediate points may or may not be equidistant from each other.

Interval Bets 30

As discussed above, system 10 permits customers 20 to place interval bets 30 on race events having a plurality of race participants, such as horse races, dog races, or auto races, for example. Each interval bet 30 may include one or more bet components 32, each comprising a bet regarding the positions of one or more particular race participants at one or more intermediate points 104 and/or at the finish line 108 of the race event.

As discussed above, each bet component 32 of an interval bet 30 may be defined by one or more various bet parameters 84, such as one or more particular race participants, one or more particular intermediate points 104, and one or more possible positions of race participants at such intermediate points 104 and/or at the finish line 108, for example. Further, the result of each bet component 32 of an interval bet 30 may be determined based on whether one or more particular race participants determined for the interval bet 30 are positioned in one or more possible positions determined for one or more particular intermediate points 104. For some interval bets 30, each bet component 32 corresponds with one of the plurality of intermediate points 104, and the result of each bet component 32 is determined based on whether one or more particular race participants determined for the interval bet 30 are positioned in one or more possible positions determined for the intermediate points 104 corresponding to that bet component 32. For example, a first bet component 32 of an interval bet 30 may comprise a bet on whether three particular horses—Horses #2, #7 and #5—are positioned in order in three randomly-determined possible positions—Positions #3, #8 and #1 (i.e., 3rd place, 8th place, and 1st place)—at a first intermediate point 104a of a horse race. A second bet component 32 of the same interval bet 30 may comprise a bet on whether the same three particular horses—Horses #2, #7 and #5—are positioned in order in three other randomly-determined particular possible positions—Positions #4, #3 and #7 (i.e., 4th place, 3rd place, and 7th place)—at a second intermediate point 104b of the same horse race. Additional bet components 32 of the same interval bet 30 may be based on whether the same or different horses are positioned any suitable number and combination of other randomly-determined possible positions at other intermediate points 104 or the finish line 108 of the same race.

The particular race participants determined for an interval bet 30 may be determined in any suitable manner. For example, one or more of the particular race participants may be selected by the customer 20 placing the interval bet 30. As another example, one or more of the particular race participants may be randomly selected by betting system platform 16. As another example, one or more of the particular race participants may be selected by betting system platform 16 based on race results regarding one or more previous race events. For instance, betting system platform 16 may select the particular race participants for an interval bet 30 based on (1) the finishing positions (or positions at some intermediate point) of race participants in a particular previous race and the numbers worn by such race participants, (2) results from one or more previous races regarding particular jockeys riding in the current race event, or (3) the finish positions (or positions at some intermediate point) in one or more previous races of one or more of the race participants participating in the current race. In a particular embodiment, betting system platform 16 may select as the particular race participants for an interval bet 30 the participants wearing the numbers of the one or more top-finishing participants in a particular previous race.

As yet another example, in embodiments in which interval bets 30 (or particular bet components 32) are pari-mutuel bets, one or more of the particular race participants for an interval bet 30 may be selected by betting system platform 16 based on (a) the participants selected for other customer's interval bets 30 on the same race event and/or (b) the wager amounts of such other interval bets 30. In some embodiments, betting system platform 16 may select the particular race participants for an interval bet 30 based on one or both of such inputs in order to increase or maximize (at least at the time that the particular race participants are selected for the interval bet 30) the potential payout(s) 80 for the customer 20 placing the interval bet 30 if the interval bet 30 (or particular bet components 32 of the interval bet 30) are winning bets. For example, for a particular interval bet 30 being generated for a particular race event, betting system platform 16 may determine for each race participant in the particular race event, the total wager amount of all other interval bets 30 for which that race participant was selected. Betting system platform 16 may then select the one or more race participants having the least associated total wager amount as the particular race participants for the particular interval bet 30. Thus, the potential payout(s) for the particular interval bet 30 may be increased or maximized (at least at the time that the particular race participants are selected for the particular interval bet 30) for the customer 20 placing the particular interval bet 30. An interval bet 30 in which the particular race participants are selected in such a manner may be referred to as a "value bet," since such bet may provide increased or maximum value to the customer 20. In an alternative embodiment, the same particular race participants are determined for each interval bet 30 associated with a particular race event. In such an embodiment, the possible positions of race participants determined for each intermediate point 104 and/or finish line 108 may be different for different interval bets 30. Thus, multiple customers 20 placing interval bets 30 on the race event are assigned the same race participants, but different possible positions at each intermediate point 104 and/or finish line 108, such that the results of the multiple interval bets 30 are (or may be) different.

Like the particular race participants determined for an interval bet 30, the particular possible positions determined for each intermediate point 104 and/or the finish line 108 of a race event may be determined in any suitable manner. For example, one or more of the particular race participants may be selected by the customer 20 placing the interval bet 30. As another example, one or more of the particular race participants may be randomly selected by betting system platform 16. As another example, one or more of the particular race participants may be otherwise determined by betting system platform 16 or otherwise determined by a bet-providing entity, such as a race track, OTB entity, or tote entity, for example.

An interval bet 30 may include one or more single-point bet components 32 and/or one or more multi-point bet components 32. A single-point bet component 32 corresponds with a single intermediate point 104 in a race event. Thus, a single-point bet component 32 corresponding with a particular intermediate point 104 in a race may comprise a bet on whether one or more particular race participants are positioned in one or more particular possible positions determined for the particular intermediate point 104. Various parameters of each single-point bet component 32 may define how to determine whether that single-point bet component 32 is a winning bet, such as (a) the number of particular race participants that must be actually positioned in the particular possible positions, and (b) whether such particular race participants must finish in such particular possible positions in a particular order. In certain embodiments, various interval bets 30 may include a single bet component 32 covering an individual intermediate point 104, multiple bet components 32 each covering a particular intermediate point 104, a single bet component 32 covering multiple intermediate points 104, multiple bet components 32 each covering multiple intermediate points 104, or any other number of bet components 32 each covering any number and combination of intermediate points 104.

As an example, with reference to FIG. 2, a single-point bet component 32 corresponding with intermediate point 104c may comprise a bet on whether three particular race participants are positioned in three particular possible positions determined for intermediate point 104c. In order for the example single-point bet component 32 to be a winning bet, the three particular race participants must be actually positioned in the three particular possible positions, in a particular order. The one or more particular race participants and the one or more particular possible positions may be determined in various manners. For instance, as discussed below in greater detail, one or more of such particular race participants and/or particular possible positions may be selected by a customer or randomly determined by betting system platform 16.

In contrast, a multi-point bet component 32 corresponds with multiple intermediate points 104 and/or the finish line 108 of a race event. Thus, a multi-point bet component 32 corresponding with a group of intermediate points 104 and/or the finish line 108 of a race may comprise a bet on whether one or more particular race participants are positioned in one or more particular possible positions determined for the particular intermediate points 104 and/or the finish line 108. Various parameters of each multi-point bet component 32 may define how to determine whether that multi-point bet component 32 is a winning bet, such as (a) the number of particular race participants that must be actually positioned in the particular possible positions determined for each of the particular intermediate points 104 and/or the finish line 108, (b) whether such particular race participants must finish in such particular possible positions in a particular order, and (c) the number and identity of particular intermediate points 104 (and/or the finish line 108) for which such particular race participants must be positioned in the correct possible positions.

As an example, with reference to FIG. 2, a multi-point bet component 32 corresponding with intermediate points 104b, 104d, 104f and finish line 108 may comprise a bet on whether three particular race participants are positioned in three particular possible positions determined for intermediate points 104b, 104d, 104f and finish line 108. In this example, in order for the multi-point bet component 32 to be a winning bet, at each of intermediate points 104b, 104d, 104f and finish line 108, at least one of the three particular race participants must be positioned in one of the three particular possible positions determined for that intermediate point 104 or finish line 108. As discussed above, the one or more particular race participants and the one or more particular possible positions may be determined in various manners, such as being selected by a customer or randomly determined by betting system platform 16.

Two-Dimensional Bet Matrix 150

In some embodiments, betting system platform 16 generates a bet matrix 150 which at least partially defines the one or more bet components 32 of an interval bet 30. FIG. 3 illustrates an example two-dimensional bet matrix 150 that comprises a number of entries 152 arranged in a plurality of columns 154 extending in a first direction 156 and a plurality of rows 158 extending in a second direction 160.

Bet matrix 150 may include one column 154 corresponding with each intermediate point 104 and one column 154 corresponding with the finish line 108 of a particular race event. In the example bet matrix 150 shown in FIG. 3, each of columns #1-#7 corresponds with one of seven intermediate points 104a-104g of a race event, respectively, and column #8 corresponds with the finish line 108 of the race event. For each column 154, the entries 152 in that column 154 are numbers representing possible positions of race participants at the intermediate point 104 (or finish line 108) corresponding with that column 154. In some embodiments, some or all of the numbers (representing possible positions) in each column 154 are determined randomly by betting system platform 16. The remaining numbers in each column 54 (if any) may be determined by a customer 20.

Bet matrix 150 may include any number of rows 158 depending on the type of the interval bet 30 associated with the bet matrix 150. For some interval bets 30, bet matrix 150 includes the number of rows 158 equal to the number of possible positions at each intermediate point 104 or the finish line 108, which equals the number of race participants in the race event. For instance, for an interval bet 30 regarding a horse race having nine participating horses, the bet matrix 150 for the interval bet 30 may include nine rows 158 such that each column 154 may include numbers representing each of the nine possible positions of each horse in the race. For other interval bets 30, bet matrix 150 includes less rows 158 than the number of possible positions (or race participants) in the race event. For instance, for an interval bet 30 regarding a horse race having 12 participating horses, the bet matrix 150 for the interval bet 30 may include only three rows 158 such that each column 154 may include three numbers representing only three of the 12 possible positions of each horse at that intermediate point 104 or finish line 108.

The example bet matrix 150 shown in FIG. 3 includes eight rows 158, namely rows #1-#8. The entries 152 in each column #1-#8 are numbers representing the first eight possible positions of race participants at the intermediate point 104 (or finish line 108) corresponding with that column 154. In this example, the entries 152 in columns #1-#7 are randomly determined possible positions, and the entries 152 in column #8 (corresponding with the finish line 108) are the first eight possible positions in order from 1 to 8. In other embodiments, the entries 152 in any of columns #1-#8 may be otherwise determined. For example, the entries 152 in all of the columns 154 in bet matrix 150 (including a column 154 corresponding to the finish line 108) may be randomly determined. In another example, the entries 152 in all columns 154 in bet matrix 150 may be determined by the customer 20. In still other embodiments, a portion of the entries 152 are randomly determined by platform 16 while the others are determined by the customer 20.

An indication of the one or more particular race participants determined for an interval bet 30, indicated as particular race participants 162, may be associated with bet matrix 150. Particular race participants 162 for interval bet 30 may be determined from the group of race participants in the race event in any suitable manner, such as being selected by the customer 20 placing the interval bet 30 or randomly determined by betting system platform 16, for example. In the example embodiment shown in FIG. 3, the particular race participants 162 determined for an interval bet 30 are three horses—Horses #1, #4 and #6—selected from ten horses (Horse #1—Horse #10) in a particular horse race.

As discussed above, bet components 32 may comprise bets on whether one or more particular race participants are positioned in one or more particular possible positions determined for one or more particular intermediate points 104 or finish line 108. Bet matrix 150 may define various types of bet components 32 for an interval bet 30 based on the occurrence and/or location of "matched" entries 170 within bet matrix 150. A matched entry 170 is an entry 152 in which one of the determined particular participants 162 is positioned in the possible position indicated by that entry 152. For example, if a particular entry 152 in a particular column 154 contains the number "3" (indicating 3rd place), the entry 152 is a matched entry 170 if one of the particular participants 162 is positioned in 3rd place at the intermediate point 104 (or finish line 108) corresponding with the particular column 154.

For some interval bets 30 or bet components 32, an entry 152 is a matched entry 170 if any of the particular participants 162 is positioned in the possible position indicated by that entry 152. For example, in the example shown in FIG. 3, entry 152 located at column #1, row #1 (i.e., number "6") is a matched entry 170 if any of Horses #1, #4 and #6 is positioned in 6th place at the first intermediate point 104a in the race. As another example, entry 152 located at column #3, row #4 (i.e., number "5") is a matched entry 170 if any of Horses #1, #4 and #6 is positioned in 5th place at the third intermediate point 104c in the race.

For other interval bets 30 or bet components 32, an entry 152 is a matched entry 170 only if a particular one of the particular participants 162 is positioned in the possible position indicated by that entry 152. For example, for some interval bets 30 or bet components 32, the particular participants 162 must be positioned in a particular order in the possible positions indicated by one or more entries 152. For instance, an example bet component 32 based on the bet matrix 150 shown in FIG. 3 is a winning bet only if the three particular participants 162—Horses #1, #4 and #6—are positioned in order in the three possible positions indicated by the first three entries 152 (i.e., the entries in rows #1-#3) in a column 154. Thus, regarding column #1 of bet matrix 150, (a) Horse #1 must be positioned in 6th place, (b) Horse #4 must be positioned in 3rd place, and (c) Horse #6 must be positioned in 7th place at the first intermediate point 104a.

As discussed above, bet matrix 150 may define various types of bet components 32 based on the occurrence and/or location of "matched" entries 170 within bet matrix 150. For example, some bet components 32 are winning bets if a particular number of matched entries 170 are aligned consecutively in direction 156 within a particular column 154. As another example, some bet components 32 are winning bets if a particular number of matched entries 170 are aligned consecutively in direction 160 within a particular row 158. As another example, some bet components 32 are winning bets if a particular number of matched entries 170 are aligned consecutively in a diagonal direction within bet matrix 150. As yet another example, some bet components 32 are winning bets if a particular number of matched entries 170 are aligned consecutively in any direction—vertically, horizontally or diagonally—within bet matrix 150.

The number of matched entries 170 that must be consecutively aligned for such bet components 32 may be any suitable number that is predetermined, randomly determined, determined by a customer 20, or otherwise determined. For some bet components 32, the number of matched entries 170 that must be consecutively aligned is equal to the number of determined race participants 162. Thus, in the example shown in FIG. 3, three matched entries 170 must be consecutively aligned for some bet components 32 to be winning bets. In other examples, the number of matched entries 170 that must be consecutively aligned could be randomly determined by platform 16 when the interval bet 30 is placed. In still other examples, a customer 20 may have the option of choosing the number of matched entries 170 that must be consecutively aligned. The payments 80 for a particular interval bet 30 (or bet component 32) may increase or decrease based on the number of matched entries 170 that must be consecutively aligned. In this regard, an internal bet 30 (or bet component 32) that requires three consecutively aligned matched entries 170 may pay out more than a bet 30 (or bet component 32) that requires two consecutively aligned matched entries 170 but less than a bet 30 (or bet component 32) that requires four consecutively aligned matched entries 170.

As yet another example, some bet components 32 are winning bets if a particular number of matched entries 170 are located in a particular row 158 and need not be aligned consecutively. The number of matched entries 170 required in the same row 158 may be any suitable number that is predetermined, randomly determined, determined by a customer 20, or otherwise determined. As with the number of consecutively aligned matched entries 170 described above, the payouts 80 for a bet component 32 may be based at least in part on the number of matched entries 170 in the same row 158 required to win. For example, in the example shown in FIG. 3, a bet component 32 may be a winning bet if at least five matched entries 170 are located in the same row 158 within bet matrix 150. As yet another example, some bet components 32 are winning bets if a particular number of matched entries 170 are located in a particular column 154 and need not be aligned consecutively. For example, in a bet matrix 150 that includes only three rows 158, a bet component 32 may be a winning bet if at least two matched entries 170 are located in the same column 154 within bet matrix 150. The payouts 80 for a bet component 32 that can win based on matched entries 170 in the same row 158 or column 154 may be less than those for bet components 32 requiring that same number of consecutively aligned matched entries 70.

As yet another example, some bet components 32 are winning bets if a particular number of matched entries 170 are located in the four corners of bet matrix 150. For example, a bet component 32 may be a winning bet if at least three matched entries 170 are located in the four corners of bet matrix 150. As yet another example, some bet components 32 are winning bets only if all of the entries 152 in the bet matrix 150 are matched entries 170. For example, in a bet matrix 150 that includes only one, two or three rows 158, a bet component 32 may be a winning bet only if all of the entries 152 in all of such rows 158 are matched entries 170.

It should be understood that other types of bet components 32 may be otherwise defined based on the occurrence and/or location of any number and combination of matched entries 70 within a bet matrix 150. It should be understood that an interval bet 30 may include any number of bet components 32, including any number of various different types of bet components 32.

Managing Various Types of Bet Components 32 Using a Bet Matrix 150

To illustrate some example types of bet components 32, suppose an interval bet 30 including four bet components 32 including:

(a) a first bet component 32a that is a winning bet if three or more instances of three matched entries 170 aligned in consecutive order either vertically, horizontally or diagonally are located within bet matrix 150;

(b) a second bet component 32b that is a winning bet if any row 158 includes at least six matched entries 170;

(c) a third bet component 32c that is a winning bet if all eight of the entries 152 in row #1 of bet matrix 150 are matched entries 170; and (d) a fourth bet component 32d that is a winning bet if the first three entries 152 in column #8 (i.e., the "win," "place" and "show" positions) of bet matrix 150 are matched entries 170.

FIG. 4 illustrates a table 200 indicating the actual positions 202 of each of the particular race participants 162— Horses #1, #4 and #6—at each intermediate point 104a-104g and at the finish line 108 of the race. In addition, the columns 154 of bet matrix 150 corresponding to each intermediate point 104a-104g and the finish line 108 are indicated below table 200 in FIG. 4.

Such actual positions 202 may be received by betting system platform 16 from recording devices 102 and 106 (discussed above) as race results 86. The actual positions 202 in table 200 may be used to identify matched entries 170 in bet matrix 150. For example, as shown in table 200, Horse #1 is positioned in 2nd place at intermediate point 104a. Thus, the entry 152 at column #1, row #5 of bet matrix 150 (see FIG. 3) is a matched entry 170 since that entry 152 is a "2," which indicates 2nd place. Further, Horse #4 is positioned in 7th place at intermediate point 104a. Thus, the entry 152 at column #1, row #3 of bet matrix 150 is a matched entry 170 since that entry 152 is a "7," which indicates 7th place. Further, Horse #6 is positioned in 12th place at intermediate point 104a. Since the entries 152 in bet matrix 150 include only numbers 1-8, there are no matched entries in column #1 corresponding to the 12th place position of Horse #6. This process may similarly be used to determine the matched entries 170 (if any) in rows #2-#8 of bet matrix 150. Each matched entry 170 in bet matrix 150 is indicated for illustrative purposes by a circle around that entry 152.

Once the matched entries 170 have been identified in bet matrix 150, results for each of the four bet components 32a-32d of the example interval bet 30 may be determined as follows:

Regarding the first bet component 32a, two instances of three matched entries 170 aligned in consecutive order are identified, including a first instance of three matched entries 170 aligned vertically in column #6, as indicated by dashed line 210, and a second instance of three matched entries 170 aligned diagonally and extending from column #2, row #7 to column #4, row #5, as indicated by dashed line 212. Thus, since first bet component 32a required three or more of such instances, first bet component 32a may be considered a losing bet.

Regarding the second bet component 32b, six matched entries 170 are located in row #5, as indicated by dashed line 214. Thus, since second bet component 32b required six or more matched entries 170 in a single row 158, second bet component 32b may be considered a winning bet.

Regarding the third bet component 32c, only three of the eight entries 152 in row #1 are matched entries 170. Thus, since third bet component 32c required all eight entries 152 in row #1 be matched entries 170, third bet component 32c may be considered a losing bet.

Regarding the fourth bet component 32d, only one of the first three entries 152 in column #8 (i.e., the "win," "place" and "show" positions) are matched entries 170. Thus, since fourth bet component 32d required all of the first three entries 152 in column #8 be matched entries 170, fourth bet component 32d may be considered a losing bet.

Thus, second bet component 32b may be considered a winning bet, while first, third and fourth bet components 32a, 32c and 32d may be considered losing bets. A payout 80 for second bet component 32b may be determined based on pari-mutuel rules or based on predetermined odds, depending on the particular embodiment.

Three-Dimensional Bet Matrix

Figure 5:
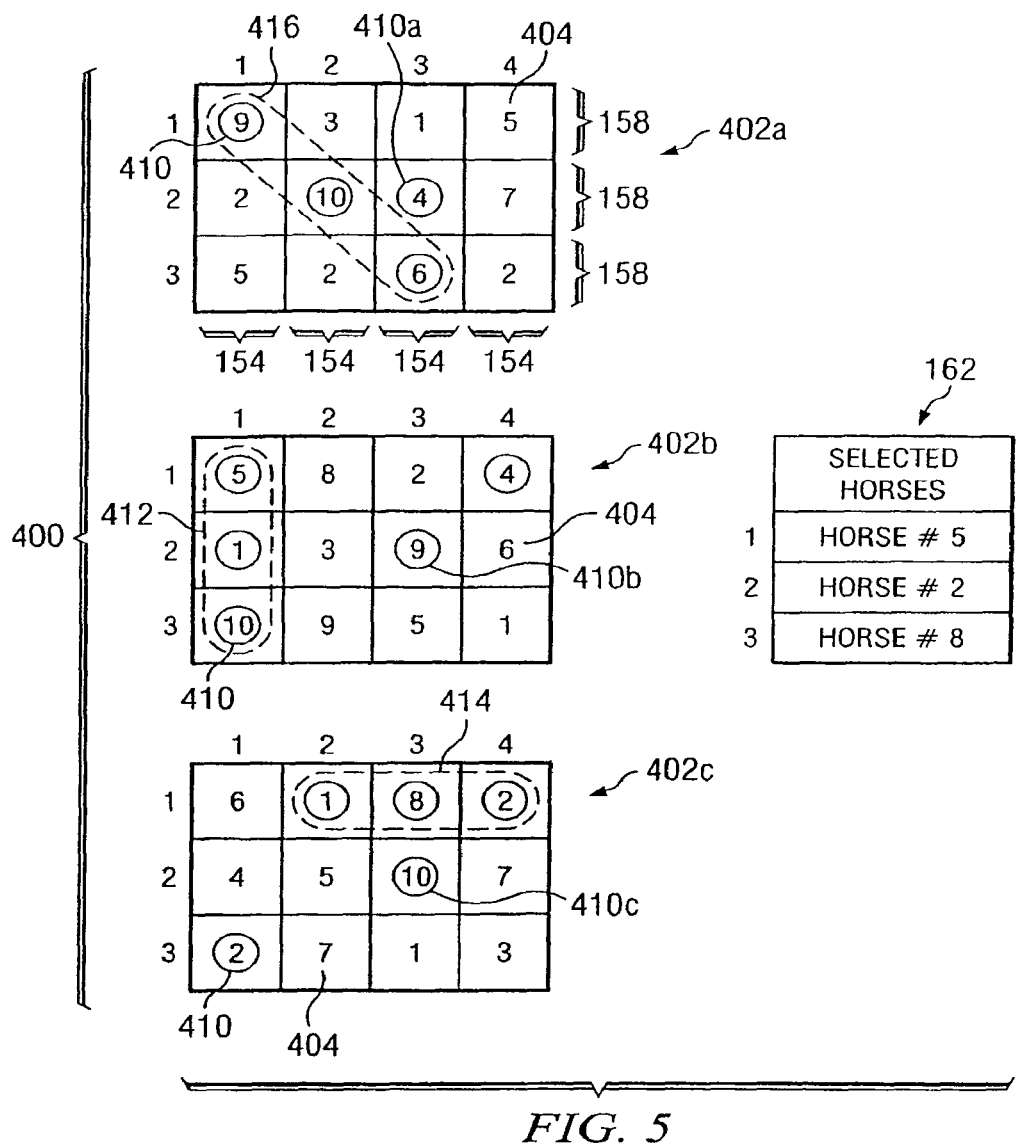
FIG. 5 illustrates an example table indicating the actual positions of particular participants at each intermediate point and at the finish line of a race event.

As discussed above, bet matrix 150 is a two-dimensional bet matrix of entries 152 used to define various bet components 32 of an interval bet 30. However, for some interval bets 30, a three-dimensional bet matrix may be used to define various bet components 32 of an interval bet 30. FIG. 5 illustrates an example three-dimensional bet matrix 400 that comprises a number of two dimensional bet matrices 402. Each two-dimensional bet matrix 402 may be similar to two-dimensional bet matrix 150 discussed above with reference to FIG. 3. Each two-dimensional bet matrix 402 within a three-dimensional bet matrix 400 may correspond to one of a group of race events, such as a group of races at a particular track in a single day or night, for example. Thus, in the embodiment shown in FIG. 5, three-dimensional bet matrix 400 includes three two-dimensional bet matrices 402a, 402b and 402c, each corresponding to one of three races scheduled to be run at a particular track on a particular night.

Each two-dimensional bet matrix 402a, 402b and 402c includes a number of entries 404 representing possible positions of race participants at an intermediate point 104 and/or the finish line 108 of the race corresponding to that two-dimensional bet matrix 402a, 402b or 402c. As discussed above regarding bet matrix 150, each column 154 in each bet matrix 402 may correspond with an intermediate point 104 or the finish line 108 of the race corresponding to that bet matrix 402. In the embodiment shown in FIG. 5, for each bet matrix 402, columns #1-#3 correspond with an intermediate point 104 in the race corresponding to that bet matrix 402 and column #4 corresponds with the finish line 108 of that race.

Entries 404 that are "matched" are indicated as circled entries 404 in FIG. 5, and denoted as matched entries 410. As discussed above regarding bet matrix 150, each matched entry 410 is an entry 404 in which one of the particular race participants (for example, the three selected horses 162 shown in FIG. 5) is positioned in the possible position indicated by that entry 404 at the intermediate point 104 or finish line 108 corresponding with the column 154 in which that entry 404 is located.

Like two-dimensional bet matrix 150, three-dimensional bet matrix 400 may at least partially define one or more various types of bet components 32 for an interval bet 30. For example, as discussed above regarding bet matrix 150, certain bet components 32 may regard whether a particular number of matched entries 404 are aligned consecutively in a particular direction, such as vertically within a single column 154, horizontally within a single row 158, or diagonally across multiple columns 154 and rows 158. Supposing that example bet components 32 require three or more matched entries 404 aligned consecutively either vertically, horizontally, or diagonally, example winning bets are shown in FIG. 5 by the groups of matched entries 404 indicated by dashed lines 412 (vertical), 414 (horizontal) and 416 (diagonal).

In addition, certain bet components 32 may regard whether a particular number of matched entries 404 are aligned consecutively in a direction perpendicular to the two-dimensional matrices 402. In other words, a particular bet component 32 may require a particular number of matched entries 404 in the same column 154 and row 158 across more than one of the two-dimensional matrices 402. For example, in the embodiment shown in FIG. 5, a particular bet component 32 may require matched entries 404 in the same column 154 and row 158 of each of the three two-dimensional matrices 402a, 402b and 402c.

An example winning bet of this type of bet component 32 is shown in FIG. 5 at column #3, row #2 of each matrix 402a, 402b and 402c, as indicated by the group of three matched entries 410a, 410b and 410c.

It should be understood that other types of bet components 32 may be otherwise defined based on the occurrence and/or location of any number and combination of matched entries 404 within bet matrix 400, including groups of matched entries 404 in any direction (for example, horizontal, vertical, or diagonal) within a single two-dimensional matrix 402 or across multiple two-dimensional matrices 402.

Jackpot Bets

In some embodiments, some or all interval bets 30 and/or bet components 32 provided by betting system platform 16 may have a jackpot bet component 94, which may be implemented in various ways. Generally, a jackpot bet component 94 is a relatively (or very) low-odds wager having a relatively (or very) high payout. For instance, regarding a two-dimensional bet matrix 150, example jackpot bet components 94 may comprise bets such as: (1) a bet that all (or a particular minimum number) of the entries 152 in one or more particular rows 158, (b) a particular minimum number of rows 158, or (c) all of the rows 158, of a bet matrix 150 will be matched entries 170; (2) a bet that all (or a particular minimum number) of the entries 152 in (a) one or more particular columns 154, (b) a particular minimum number of columns 154, or (c) all of the columns 154, of a bet matrix 150 will be matched entries 170 (which bet may or may not require the particular race participants to be in a particular order in the possible positions indicated by the entries 152 in each of such particular columns 154); and (3) a bet that a particular minimum number of entries 152 in bet matrix 150 will be matched entries 170. A jackpot bet component 94 may be a particular bet component 32 of an interval bet 30 or may comprise a portion of an interval bet 30 or one or more particular bet components 32 of an interval bet 30.

In some embodiments, a fraction of the wager amount of an interval bet 30 placed by a customer 20 may be assigned to one or more jackpot bet components 94, either automatically or upon selection by the customer 20. For example, a customer 20 may have the option of having a particular percentage of the wager amount of his interval bet 30 allocated to one or more particular jackpot bet components 94. As another example, a particular percentage of the wager amounts of interval bets 30 received from customers 20 may be automatically allocated to one or more particular jackpot bet components 94. For instance, for a one-mile race event having seven intermediate points 104, betting system platform 16 may automatically allocate the wager amount for an interval bet 30 placed by a customer 20 into nine equal portions for nine bet components 32—one for each of the seven intermediate points 104, one for the finish line 108, and one jackpot bet component 94.

In some embodiments, a jackpot bet component 94 may be associated with a rolling pot (or "jackpot pool") that grows over time (e.g., over a number of race events, days, weeks, or years) until a customer 20 has a winning jackpot bet component 94 and wins the jackpot pool. Thus, if there are no winning bets on a particular jackpot bet component 94 for a particular race, the wager amounts allocated to such jackpot bet components 94 may be maintained in a jackpot pool and carried forward to one or more subsequent races. A separate jackpot pool may be maintained for each type of jackpot bet component 94 such that multiple jackpot pools may be maintained simultaneously. Alternatively, a single jackpot pool may be used for multiple (or all) types of jackpot bets 94 offered at a particular track or by betting system platform 16, for example.

In other embodiments, rather than having a rolling jackpot pool, a jackpot bet component 94 may be associated with a single race event. For example, a jackpot bet component 94 may comprise a bet regarding the (1) the number of rows 158 in a bet matrix 150 having a particular number of matched entries 170; (2) the number of columns 154 in a bet matrix 150 having a particular number of matched entries 170; or (3) the total number of matched entries 170 in a bet matrix 150. The interval bet(s) 30 having bet matrices with the greatest number of such rows 158, columns 154, or total matched entries 170 may be deemed as having a winning jackpot bet component 94 and payouts 80 may be awarded to the customer(s) 20 that placed such interval bet(s) 30.

Example Operation of System 10

Figure 6:
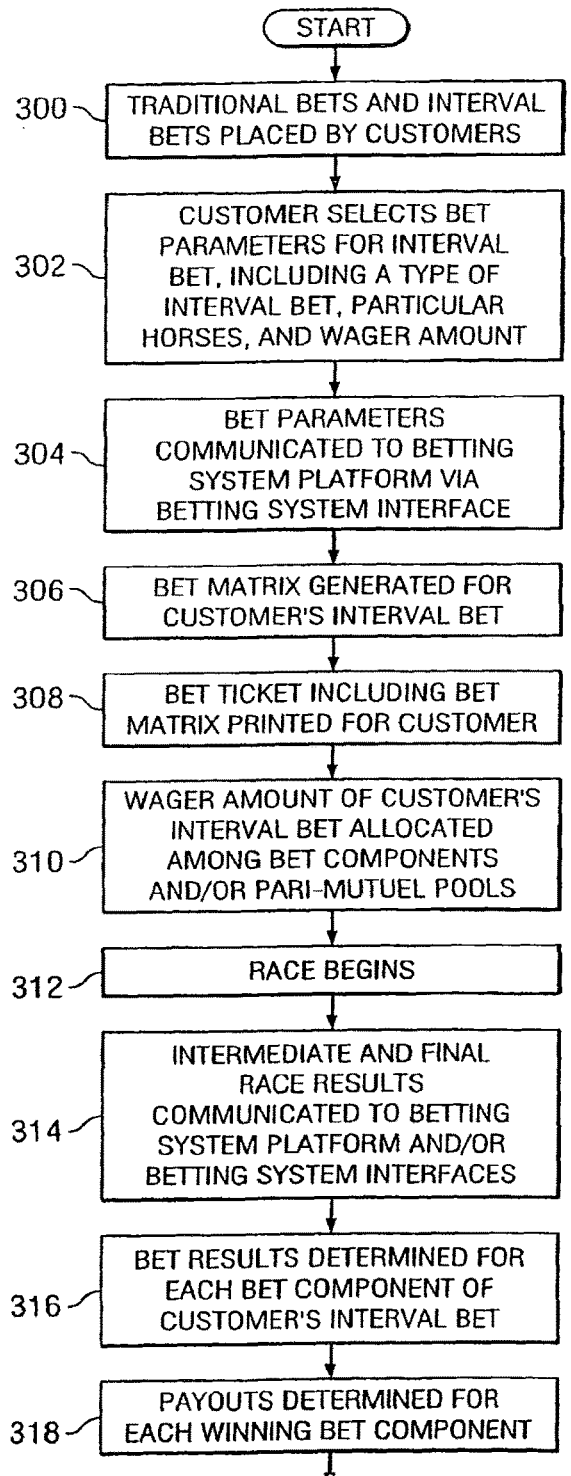
FIG. 6 is a flowchart illustrating an example method of receiving and managing interval bets in accordance with an embodiment of the present invention.

FIG. 6 is a flowchart illustrating an example method of receiving and managing interval bets 30 in accordance with an embodiment of the present invention. At step 300, bets 12—including interval bets 30 and/or traditional bets 34—regarding a particular race event are received from customers 20 via one or more betting system interfaces 14, such as described above with reference to FIG. 1.

At steps 302-308, a particular customer 20a places an interval bet 30a regarding a particular horse race as follows. At step 302, customer 20a selects one or more bet parameters 84a for an interval bet 30a, including, for example, a type of interval bet 30a, one or more bet components 32A of the interval bet 30a, one or more particular horses from the group of horses scheduled to race in the particular horse race, and/or a wager amount for the interval bet 30a or for each bet component 32A of interval bet 30A. In other embodiments, the one or more particular horses for interval bet 30a may be otherwise determined, such as randomly determined by betting system platform 16, for example. In this example, suppose customer 20a selects two horses, for example Horse #3 and Horse #7. At step 304, customer 20a communicates the bet parameters 84a, as well as the wager amount, to a betting system interface 14, which communicates the bet parameters 84a to betting system platform 16. At step 306, betting system platform 16 generates a bet matrix 150a for customer 20a's interval bet 30 based on the received bet parameters 84a and various event parameters 82 regarding the particular horse race, such as the length of the race and the number of horses scheduled to compete in the race, for example. In other embodiments, all or portions of bet matrix 150*a* may be generated by customer 20*a*. For example, customer 20*a* may select some or all of the entries 152 of bet matrix 150*a*. In any event, betting system platform 16 may store the generated bet matrix 150*a* in memory 72. At step 308, betting system platform 16 communicates the bet matrix 150*a* to an appropriate betting system interfaces 14, such as a teller 44 or self-service machine 48, for example, such that the betting system interfaces 14 may print a bet ticket 92 for customer 20*a* that includes some or all of the following: (a) a printed version of the bet matrix 150*a*, (b) the wager amount, (c) an indication of the track and particular race event, (d) the scheduled time for the particular race event, and (e) an indication of the two horses (Horse #3 and Horse #7) selected by customer 20*a*. Customer 20*a* may use bet ticket 92 to track the progress of his interval bet 30*a* and determine a result for each bet component 32*a* of interval bet 30*a*, such as discussed below at step 314.

At step 310, betting system platform 16 may allocate the wager amount of interval bet 30*a* among the various bet components 32*a* of interval bet 30*a*. Such allocation may be made (a) according to selections made by customer 20*a* when placing interval bet 30*a*, (b) based on predetermined wager allocation rules maintained by betting system platform 16, or (c) according to other criteria. In some embodiments, betting system platform 16 allocates an equal portion of the wager amount of interval bet 30*a* to each of the bet components 32*a* of interval bet 30*a*. For example, for an interval bet 30*a* having three bet components 32*a*, betting system platform 16 allocates a third of the wager amount to each of the three bet components 32*a*. As another example, for a race event having eight bet components (such as a one mile race having a bet component 32 corresponding to each ⅛ mile of the race, for example), 12.5¢ of each $1.00 wagered on an interval bet 30 may be allocated to each of the eight bet components 32. In some embodiments, betting system platform 16 may automatically allocate the wager amount of an interval bet 30*a* based on the length of the race event or the number of intermediate points 104 in the race event. For example, in a seven-furlong (⅞ mile) race event having intermediate points 104 at each furlong (i.e., each ⅛ mile), betting system platform 16 may automatically allocate the wager amount of an interval bet 30*a* on the race event into sevenths, wherein one-seventh is allocated to each of seven bet components 32 (one corresponding to each of six intermediate points 104 and one corresponding to the finish line 108). In other embodiments, betting system platform 16 and/or a betting system interface 14 may allow customer 20*a* to provide input regarding the allocation of the wager amount of interval bet 30*a* among the various bet components 32*a* of interval bet 30*a*. For example, supposing interval bet 30*a* includes three bet components 32*a*, customer 20*a* may request to allocate 50% of the wager amount to one of the bet components 32*a* and 25% to each of the other two bet components 32*a*. In embodiments in which interval bets 30 are pari-mutuel bets, the allocation of the wager amount to each of the bet components 32*a* of interval bet 30*a* may include allocating the wager amount into one or more pari-mutuel pools. For example, in an embodiment in which a separate pari-mutuel pool is provided for each type of bet component 32*a*, betting system platform 16 may allocate the wager amount into the various pari-mutuel pools according to any of the criteria discussed above.

At step 312, the particular race event begins. At step 314, race results 86 are communicated from the track, an OTB entity, or some other entity to betting system platform 16. Race results 86 may indicate at least the actual positions 202 of each horse in the particular race at each intermediate point 104 and at the finish line 108 of the race. For example, race results 86 may include the type of data in table 200 shown in FIG. 4. In some embodiments, such race results 86 are also communicated to one or more betting system interfaces 14 such that customers 20 may track the progress of the race and/or their bets 12 on the race. In some embodiments, race results 86 are communicated to betting system platform 16 and/or betting system interfaces 14 in real time or substantially in real time.

At step 316, betting system platform 16 may determine a bet result 78 for each bet component 32*a* of interval bet 30*a* based on the received race results 86 regarding the race, bet parameters 84 regarding each bet component 32*a*, and bet matrix 150*a* generated at step 306. For example, betting system platform 16 may determine whether each bet component 32*a* is a "win," "loss," "push," or "no action" using one or more of the techniques discussed above with reference to FIGS. 3-4.

At step 318, betting system platform 16 may determine a payout 80 for each bet component 32*a* determined to be a winning bet at step 316. In a pari-mutuel system, betting system platform 16 may determine a payout 80 for each bet component 32*a* according to known methods for determining pari-mutuel payouts. Betting system platform 16 may take out a commission, or "take out," from the wager amount of the interval bet 30*a* or from the portion of the wager amount allocated to each bet component 32*a*. For example, in some embodiments, such commission or "take out" may be a predetermined percentage (such as 10% for example) of the wager amount. In some instances, payouts 80 determined for customer 20*a* may be paid to customer 20*a* via one or more betting system interfaces 14. Alternatively, betting system platform 16 may update a wagering account for customer 20*a* based on the amounts of such payouts 80.

If it is determined that, for a particular pari-mutuel pool, none of the bet components 32*a* assigned to that pool are winning bets, the wager amounts for such bet components 32*a* may be returned to the customers 20 who placed such bets, carried forward to a new pari-mutuel pool associated with a subsequent race, or otherwise handled.

It should be understood that the example method described above may also apply to interval bets 30 using other type of bet matrices, such as a three-dimensional bet matrix 400, within the scope of the invention. It should also be understood that in various embodiments, the steps of the methods shown in FIG. 6 may be performed in any suitable order and may overlap in whole or in part without departing from the scope of the present invention. In addition, various steps and methods shown in FIG. 6 may be performed in serial or parallel, notwithstanding the example representations shown in FIG. 6.

In some embodiments, interval bets 30 may further comprise bets regarding the outcome of a game that is based at least in part upon the intermediate results 86 of the race event. For example, the interval bet 30 may comprise a bet regarding the outcome of a hand of blackjack or poker. In these examples, the hand of blackjack or poker associated with the customer 20 placing the bet 30 is comprised of simulated playing cards that are determined according to the position and/or time of a particular race participant at various intermediate points 104 in a race event. The hand of blackjack or poker associated with a first customer 20 is compared against a hand of blackjack or poker, respectively, associated with another customer 20 or a house entity to determine the result of the bet 30.

Figure 7:
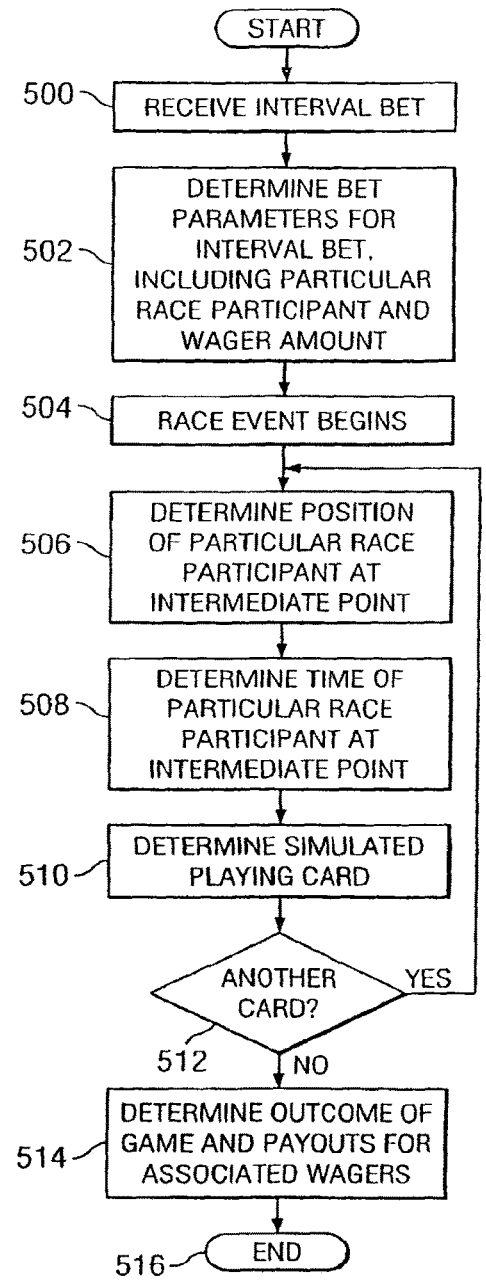
FIG. 7 is a flowchart illustrating another example method of receiving and managing interval bets in accordance with an embodiment of the present invention.

FIG. 7 is a flowchart illustrating an example method of receiving and managing interval bets 30 regarding the outcome of a game in accordance with an embodiment of the present invention. At step 500, an interval bet 30 regarding the outcome of a game is received from a customer 20 via one or more betting system interfaces 14, such as described above with reference to FIG. 1. At step 502, processor 70 determines bet parameters 84 associated with the interval bet 30 received at step 500. For example, processor 70 determines the particular race participant to be used in the interval bet 30. The particular race participant is one of many race participants in the particular race event, and may be selected by customer 20 or randomly by betting system platform 16. In this example, suppose customer 20 selected Horse #7 from a particular horse race to be used in the interval bet 30. Processor 70 also determines a wager amount associated with the interval bet 30.

The race event begins at step 504 and platform 16 determines intermediate race results 86. In particular, at step 506, processor 70 determines the actual position 202 of the particular race participant, Horse #7, among all of the participants at a particular intermediate point 104. At step 506, processor 70 determines the actual time of the particular race participant, Horse #7, at the particular intermediate point 104. Although the description is detailed with reference to determining and using the actual times of the particular race participant selected or assigned to the customer 20 at various intermediate points in the race, it should be understood that the actual time of the lead participant at various intermediate points in the race may also be determined and used for processing interval bets 30. The lead participant comprises the participant that is leading the race (or at least tied for the lead) at the particular intermediate point 104 in the race. The actual time of the particular race participant (or the lead participant) may comprise the time that has elapsed from the beginning of the race, from a previous intermediate point 104, or from any other suitable point in the race event, to the point where the particular race participant (or the lead participant) reached the particular intermediate point 104.

Processor 70 determines a simulated playing card for the customer 20 at step 510 based on the determined position and/or time of the particular race participant (or the lead participant) at the particular intermediate point 104. In one embodiment, processor 70 determines the value of the simulated playing card (e.g., A, 2, 3, 4, 5, 6, 7, 8, 9, 10, J, Q, K) based on the position 202 of the particular race participant among all race participants at the particular intermediate point 104, and processor 70 determines the suit of the simulated playing card (e.g., Heart, Diamond, Club, Spade) based on the time of the particular race participant at the intermediate point 104 (or the time of the lead participant at such intermediate point 104). In other embodiments, processor 70 determines the value of the simulated playing card based on the time of the race participant (or the lead participant) and determines the suit of the simulated playing card based on the position 202 of the race participant. In still other embodiments, both the value and suit of the simulated playing card are determined based on either the position 202 or time of the race participant, or upon any other suitable number and combination of factors associated with the race event.

To determine the value of the simulated playing card, processor 70 may map the position 202 determined at step 506 to one of the following card values: A, 2, 3, 4, 5, 6, 7, 8, 9, 10, J, Q, and K. For example, processor 70 may randomly assign one or more card values to each possible position 202 at the beginning of a race event and/or at each intermediate point 104 in the race event, and at the finish line 108. Processor 70 may use the same or different randomly assigned mapping of positions 202 and card values for each customer 20 placing an interval bet 30 regarding a particular race event. Therefore, for a particular intermediate point 104 in a race event having eight participants, processor 70 may randomly determine the following mapping of positions 202 and card values for one or more customers 20.

| Position | Card Value |
| --- | --- |
| 1 | 3, Q |
| 2 | A, 4 |
| 3 | 5, J |
| 4 | 7, 10 |
| 5 | K, 8 |
| 6 | 6 |
| 7 | 2 |
| 8 | 9 |

For a subsequent intermediate point 104, processor 70 may determine the same or different mapping of positions 202 and card values for one or more customers 20. The mapping of positions 202 and card values may further be determined by customers 20, the results of previous race events, or any other suitable number and combinations of characteristics associated with one or more race events.

To determine the suit of the simulated playing card, processor 70 may map the time determined at step 508 to one of the following card suits: Heart, Diamond, Club, and Spade. For example, processor 70 may randomly assign one or more card suits to fractional values of time. This assignment may occur at the beginning of a race event and/or at each intermediate point 104 in the race event and at the finish line 108. Processor 70 may use the same or different randomly assigned mapping of time and card suits for each customer 20 placing an interval bet 30 regarding a particular race event. Alternatively, processor 70 may use a fixed mapping of time and card suits for all intermediate points 104 and finish line 108 for all customers 20. Therefore, for a first intermediate point 104 in a race event having eight participants, processor 70 may determine the following mapping of time and card suits.

| Time (seconds) | Card Suit |
| --- | --- |
| .00-.24 | Heart |
| .25-.49 | Diamond |
| .50-.74 | Club |
| .75-.99 | Spade |

For a subsequent intermediate point 104, processor 70 may determine the same or different mapping of time and card suits for one or more customers 20. The mapping of time and card suits may further be determined by customers 20, the results of previous race events, or any other suitable number and combinations of characteristics associated with one or more race events.

Although a particular mapping of time to card suit is described above, it should be understood that any suitable level of granularity in time may be used to perform the mapping. For example, a mapping could be 0.00 seconds=Hart; 0.01 seconds=Diamond; 0.02 seconds=Club; 0.03 seconds=Spade; 0.04 seconds=Hart; 0.05 seconds=Diamond; 0.07 seconds=Club; and 0.08 seconds=Spade; etc.

Continuing with the example using the first mapping set forth above, suppose Horse #7 reached the first intermediate point 104 in seventh place with a fractional time of 0.55 seconds. In this example, processor 70 would determine a simulated playing card of "2 of Clubs" for customer 20.

Execution proceeds to step 512 where processor 70 determines whether to provide another simulated playing card to the customer 20. This decision may be based at least in part upon the rules of the game being played and/or upon instructions received from the customer 20. For example, in a blackjack game, the customer 20 may determine that the hand that has been created by the previously determined simulated playing cards is sufficient and, therefore, the customer 20 may communicate a "stand" command indicating that the customer 20 does not wish to receive any more simulated playing cards. This "stand" command may be communicated by the customer 20 using any suitable voice or data based communication device, such as those associated with betting system interfaces 14. If simulated playing cards are being associated with a house entity in blackjack, then the determination at step 512 may be based upon rules associated with blackjack that determine whether a dealer must or must not receive another card. For example, as in blackjack, the house entity may be required to continue receiving simulated playing cards and/or be required to stop receiving simulated playing cards based upon the current hand of cards already associated with the house entity.

With respect to poker, the customer 20 may continue receiving simulated betting cards at any number and combination of intermediate points 104 until a suitable number of simulated playing cards have been associated with the customer 20 per the rules of the type of poker being played. In some embodiments, the customer 20 receives a simulated playing card at each intermediate point 104 of the race event, and then determines a hand of poker to be played based upon at least a portion of the simulated playing cards that have been determined for the customer 20. For example, the customer 20 may receive eight simulated playing cards and then determine the best hand for playing poker using five of the simulated playing cards, thereby discarding three of the simulated playing cards from the hand. One of skill in the art can therefore appreciate that any variety of poker may be implemented using these techniques and that any number and combination of simulated playing cards may be determined for the customer 20 at intermediate points 104 to satisfy the rules of the particular type of poker being played.

If it is determined at step 512 that another simulated playing card is to be determined for the customer 20, then execution returns to steps 506-508 where processor 70 determines another simulated playing card for the customer 20 based upon the position and/or time of the particular race participant at another intermediate point 104, such as the next intermediate point 104, in the race event. Steps 506-512 are therefore repeated until it is determined that no additional simulated playing cards are to be determined for the customer 20. At this point, execution proceeds to step 514, where processor 70 determines the outcome of the game and payouts for the interval bets 30.

To determine the outcome of a blackjack game, for example, processor 70 compares the hand of simulated playing cards determined for the customer 20 with the hand of simulated playing cards determined for a house entity. Based at least upon this comparison and the rules of blackjack, it is determined whether the customer 20 won the interval bet 30. If so, the customer 20 receives a pari-mutuel payout for the interval bet 30 based at least in part upon the amount wagered by the customer 20 and the size of the betting pool associated with the interval bet 30. The betting pool may comprise the sum of all amounts wagered on a blackjack type interval bet 30 for the particular race event, less a takeout or commission charged by the race track.

To determine the outcome of a poker game, for example, processor 70 compares the hand of simulated playing cards determined for the customer 20 with the hands of simulated playing cards determined for other customers 20. Based at least upon this comparison and the rules of poker, it is determined whether the customer 20 won the interval bet 30. In one embodiment, the group of all customers 20 that placed a poker type interval bet 30 for a particular race event is divided into sub-groups to mimic a "poker table." Each poker table may comprise any number of customers 20. In a particular embodiment, the composition of each poker table may be randomly determined before the race event begins. In another embodiment, each poker table is comprised of any suitable number of customers 20 that placed sequential interval bets 30 for the particular race event. For example, the first ten customers 20 that placed interval bets 30 for the particular race event may be placed at one poker table. The next ten customers 20 that placed interval bets 30 for the particular race event may be placed at another poker table. Each additional poker table may comprise the next ten customers 20 that placed interval bets 30 for the particular race event.

To win the interval bet 30 in an embodiment using poker tables, a customer 20 assigned to a particular poker table need only establish a winning hand of simulated playing cards among all of the customers 20 at the poker table. The winning customer(s) 20 receives a pari-mutuel payout for the interval bet 30 based at least in part upon the amount wagered by the customer(s) 20 and the size of the betting pool associated with the interval bet 30. The betting pool may comprise the sum of all amounts wagered by all the customers 20 at the particular poker table, less a takeout or commission charged by the race track.

In still other embodiments, the customer 20 plays poker against a house entity. If the customer 20 wins, then processor 70 may determine a pari-mutuel payout for the customer 20 based at least in part upon the amount wagered by the customer and the size of the entire betting pool associated with the interval bet 30.

Figure 8:
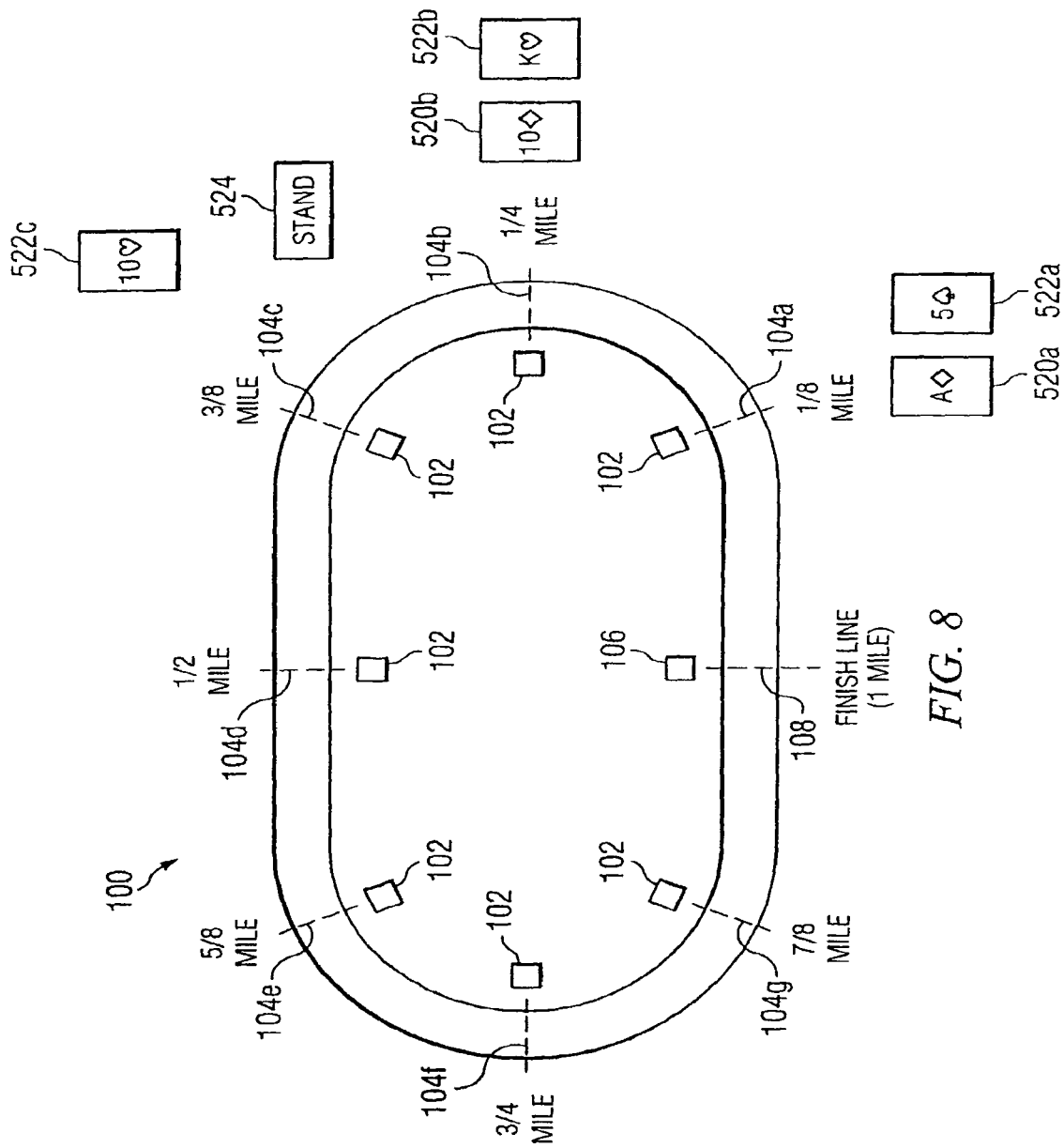
FIG. 8 illustrates an example race track for use in generating and managing a blackjack type interval bet.

FIG. 8 illustrates an example race track 100 for use in generating and managing a blackjack type interval bet 30. As explained above with regard to FIG. 7, simulated playing cards 520 are determined for the customer 20 at various intermediate points 104 of the race event. In this example, simulated playing cards 522 are determined for a house entity against whom the customer 20 will play a hand of blackjack for determining the outcome of the interval bet 30.

In particular, based upon the particular position and/or time of the particular race horse associated with customer 20, such as Horse #7 used in the example above, at intermediate point 104a, processor 70 determines a simulated playing card 520a of "Ace of Diamonds" for the customer 20. Simulated playing card 520a may be presented to the customer 20 in real time using any suitable voice or data based communication device, such as those associated with betting system interfaces 14. In addition, based upon the particular position and/or time of the particular race horse associated with the house entity at intermediate point 104a, processor 70 determines a simulated playing card 522a of "5 of Spades" for the house entity. The first simulated playing card 522a may or may not be presented to the customer 20. At this point, each of the customer 20 and the house entity has been "dealt" a first simulated playing card.

At intermediate point 104*b*, processor 70 again determines simulated playing cards 520 and 522. For example, processor 70 may determine a simulated playing card 520*b* of "10 of Diamonds" for customer 20 and a simulated playing card of "King of Hearts" for the house entity based upon the position and/or time of the appropriate race participants assigned to the customer 20 and house entity, respectively, at intermediate point 104*b*. The simulated playing card 520*b* may be presented to the customer 20 in real time using any suitable voice or data based communication device, such as those associated with betting system interfaces 14. At this point, the customer 20 has a cumulative blackjack count of twenty against a house entity hand of fifteen. Customer 20 may therefore decide to issue a "stand" command 524 indicating that no further simulated playing cards 520 are to be associated with the customer 20 in this hand of blackjack. In this regard, the "stand" command can be used to determine the number of cards 520 that are "dealt" to the customer 20. If the customer 20 does not issue a command 524 before a predetermined time or a predetermined point in the race event, such as the next intermediate point 104, then another simulated playing card 520 is automatically determined for the customer 20. According to the rules of blackjack, the house entity cannot "stand" with a count of fifteen. Therefore, processor 70 determines another simulated playing card 522*c* of "10 of Hearts" for the house entity at intermediate point 104*c* based upon the position and/or time of the horse associated with the house entity. The addition of the ten to the blackjack count of fifteen already maintained by the house entity creates a blackjack count of twenty-five for the house entity.

Processor 70 compares the blackjack count of twenty associated with the customer 20 against the blackjack count of twenty-five associated with the house entity and, according to the rules of blackjack, determines that the customer wins the hand of blackjack because the house entity "busted." As a winner of the interval bet 30, the customer 20 receives a payout comprising a pari-mutuel share of the entire betting pool for the interval bet 30, less a takeout or commission charged by the race track.

Figure 9:
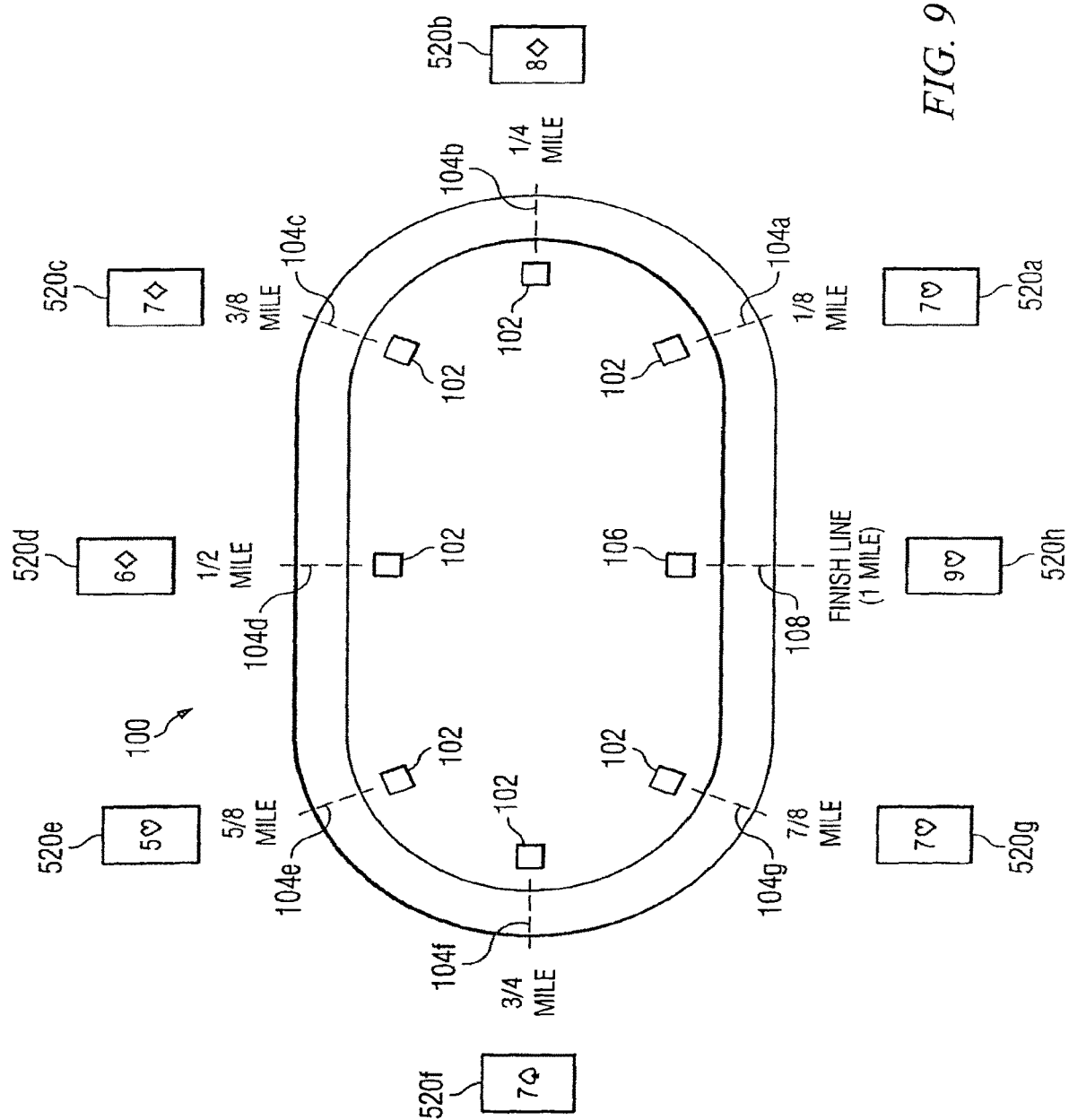
FIG. 9 illustrates an example race track for use in generating and managing a poker type interval bet.

FIG. 9 illustrates an example race track 100 for use in generating and managing a poker type interval bet 30. As explained above with regard to FIG. 7, simulated playing cards 520 are determined for the customer 20 at various intermediate points 104 of the race event. In particular, based upon the particular position and/or time of the particular race horse associated with customer 20, such as Horse #7 used in the example above, at intermediate point 104*a*, processor 70 determines a simulated playing card 520*a* of "7 of Hearts" for the customer 20.

Customer 20 may receive simulated betting cards 520 at any number and combination of additional intermediate points 104 until a suitable number of simulated playing cards 520 have been "dealt" to the customer 20 to play the type of poker associated with the interval bet 30. For example, customer 20 may receive the following simulated playing cards 520*b*-520*h* based upon the position and/or time of Horse #7 at intermediate points 104*b*-104*g* and at finish line 108: "8 of Diamonds" at intermediate point 104*b*; "7 of Diamonds" at intermediate point 104*c*; "6 of Diamonds" at intermediate point 104*d*; "5 of Hearts" at intermediate point 104*e*; "7 of Spades" at intermediate point 104*f*; "7 of Hearts" at intermediate point 104*g*; and "9 of Hearts" at finish line 108. Simulated playing card 520*a*-520*h* may be presented to the customer 20 using any suitable communication device in real time using any suitable voice or data based communication device, such as those associated with betting system interfaces 14. Customer 20 may then select a portion of the simulated playing cards 520, and discard other cards 520, to formulate a hand of poker that will be used to determine the outcome of the interval bet 30. In one embodiment, a customer 20 may receive and use duplicate cards 520, such as cards 520*a* and 520*g* (e.g., "7 of Hearts"), in the hand of poker. In this embodiment, customer 20 may select simulated playing cards 520*a*, 520*c*, 520*f*, 520*g*, and 520*h* such that the customer has four cards with a value of seven, also referred to as "four-of-a-kind." In other embodiments where a customer 20 may not use duplicate cards, one of cards 520*a* and 520*g* are automatically discarded. In this embodiment, the customer 20 may select simulated playing cards 520*a*, 520*b*, 520*d*, 520*e*, and 520*h* such that the customer has five cards of sequential value, also referred to as a "straight."

Processor 70 compares the appropriate hand of poker associated with customer 20 with the hands of poker held by other customers 20 of the interval bet 30, such as, for example, hands of poker held by other customers 20 at the same poker table, or with a hand of poker held by a house entity. Based at least upon this comparison and the rules of poker, it is determined whether the customer 20 won the interval bet 30. As a winner of the interval bet 30, customer 20 receives a payout comprising a pari-mutuel share of the appropriate betting pool for the interval bet 30, less a takeout or commission charged by the race track.

In various embodiments, information about the position of one or more race participants at one or more intermediate points within a race event may be used to generate results of a game. In various embodiments, information about the position of one or more race participants at one or more intermediate points within a race event may be used to determine actions in a game. In some embodiments, the information may include a position of a single race participant, a position of multiple race participants, information about a single intermediate point, information about multiple intermediate points, and/or any other combination of information about the position of one or more race participants at one or more intermediate points of a race event.

A position of a race participant at an intermediate point within a race event may include a relative rank of the race participant compared to other race participants, a time (e.g., time elapsed from start of the race event to reach the intermediate point, time elapsed between leading and/or lagging race participants, etc.), an order of race participants, a change in time (e.g., change in amount of time elapsed between race participants, change in amount of time elapsed between race intervals, etc.), a change in order (e.g., a change in the order of race participants from a prior interval, etc.), a distance (e.g., a distance between race participants, a change in distance traveled over a period of time, etc.), and/or any other information related to a position of one or more race participants at one or more intermediate points of a race event.

In various embodiments, one or more positions may be used as input to one or more functions that may generate outcomes and/or actions related to a game. It should be understood that using one or more positions to determine such outcomes and/or actions may include using transformations of any information related to the positions. Some example functions may include a random number generator, a lookup table, a formula, and so on. For example, a number indicating an order may be used as a seed for a random number generator in some embodiments. As another example, an n-dimensional lookup chart may be referenced with n numbers, each number indicating a rank of a race participant at at least one intermediate point, to determine an outcome and/or action. As yet another example, one or more positions (e.g., orders, times, etc.) may be used as variables in a formula that may transform a position into an action and/or outcome. It should be understood that these examples are non-limiting and that in various embodiments any transformation and/or combinations of transformations from a position to an outcome and/or result may be used to determine outcomes and/or actions based on positions.

Some embodiments may include a game (e.g., a card game, a roulette game, a number-based game, a slot game, a fantasy sports game, etc.) in which an outcome is determined based on one or more positions. The outcome, for example, may be based on a value from random number generator, a lookup table, etc. Based on the outcome, one or more actions that may lead to that outcome may be determined. In some embodiments, an outcome may be obtained in a game based through a plurality of game actions (e.g., card draws, slot symbol choices, etc.). For example, the order of a plurality of race participants may be used to lookup a result of a card game that corresponds to a dealer going bust in a hand of blackjack. Based on that result, a set of cards and actions performed by the dealer may be determined that would lead to that result. The game may then proceed so that the dealer busts by performing the actions. In some embodiments, the actions may be chosen randomly from a set of actions that would result in the outcome. In some embodiments, a second position may be used to select the action from a set of possible actions that would result in the outcome.

Some embodiments may include a number-based game. A number-based game may include, for example, a keno game, a lottery game, a dice-based game (e.g., craps), and so on. A number-based game may include a game in which the result of the game is based only on one or more numbers and a bet (e.g., a bet on a sequence of lottery numbers, a bet on a roll of a pair of dice, etc.). Card games, slot games, and many other casino games generally do not fall in this category since they typically include non-number based criteria (e.g., card suit, symbols, etc.). In various embodiments, one or more positions may be used to determine components of a number based game (i.e., numbers draw, an order of numbers, an outcome, etc.). In one example, information about a position may be used as input to a formula. The result of the formula may be a number chosen in the game. In another example, a plurality of numbers may be determined based on information about one or more positions. The numbers may be used as a source for determining an outcome of the game. For example, for a lottery game that involves the choosing of five numbers, a race event may be divided into seven intervals. Positions of race participants at each of the seven intervals may be used to determine a respective one of seven numbers. The final five numbers that make up the winning lottery combination may be chosen from these seven numbers. The choosing of the five numbers may be made in any way (e.g., by a person, based on a final position, randomly, etc.).

Some embodiments may include a slot game. A slot game may include, for example, one or more reels. Each reel may have one or more symbols thereon. The reels may rotate for some period of time. At the end of rotation, the reels may be stopped so that each displays one or more symbol. In some embodiments, the symbol shown may be determined based on one or more positions of one or more race participants in a race event. In some implementations, the outcome may be determined directly based on the positions, and then the symbols may be determined based on the outcome. In other embodiments, each symbol may be determined based on the positions. In some embodiments, each race participant may correspond to a reel of a slot machine. A position of each race participant at one or more intermediate points may then determine the symbol shown on each reel.

Some embodiments may include altering a characteristic of one or more games based on one or more positions of one or more race participants at one or more intermediate points of a race event. In some embodiments, the characteristics may include characteristics that define when a game is won, characteristics that define an amount to be won, characteristics that determine an odds of winning a game, and/or any other desired characteristics. For example, in one embodiment, if a particular position occurs, a bonus round may be initiated in a game. During the bonus round, payout for winnings may be increased, the odds of winning may be increased, different rules for determining when a player wins may be used, etc. In some implementations, such a bonus round may be started if an unlikely event occurs (e.g., a race participant does unusually well and/or unusually poorly, an unlikely change of orders in a race occur, an underdog does well, a favored participant does poorly, etc.). One particular implementation may include initiating a bonus round if a race participant in last place at a first intermediate point is at first place at a second intermediate point or a final point, and/or a race participant at first place at a first intermediate point is at last place at the second intermediate point or final point.

In some embodiments, a combination of positions may be used to determine outcomes and/or actions. It should be understood that any combination of positions of race participants at any number of intermediate points of a race event may be combined in any way according to various embodiments. The combination of multiple intermediate points may increase the number of possible input combinations for a determining function (e.g., the order of eight participants at two points allows more combinations than the input of order of the eight participants at a single point).

In some embodiments, positions may be largely random. In some embodiments, likely positions and/or odds about positions may be known. For example, it may be known that one or more race participants are generally faster early and/or later in a race event. Using such information, approximate and/or exact odds related to the order of participants at a particular intermediate point may be determined. Such odds may be used to assign certain actions and/or outcomes that a game operator wants to happen less to orders less likely to occur, and/or conversely to assign certain actions and/or outcomes that a game operator wants to happen more to orders more likely to occur.

In some embodiments, relationships between positions associated with one intermediate point and positions associated with one or more other intermediate points and/or final points may be known. For example, it may be known that a race participant that is first at a first intermediate point is unlikely to be last at a second intermediate point. Accordingly, odds of actions and/or outcomes occurring may be assigned to combinations according to their desired frequency by assigning them to combinations that have a desired likelihood of occurrence. For example, a bonus round may occur if a very unlikely combination of events occurs (e.g., a race participant in first place at a first point is in last place at a second point, and a race participant in last place at the first point is in first place at the second point, etc.).

In various embodiments, indications of actions, outcomes, and/or any other information may be provided. Such indications may be provided through by a person, by a display, by a computer, and/or by any other desired source. Such indications may include electronic transmissions of information, verbal remarks, visual displays, and/or any other information from which at least a portion of the actions and/or outcomes may be derived.

Although embodiments of the invention and their advantages are described in detail, a person skilled in the art could make various alterations, additions, and omissions without departing from the spirit and scope of the present invention as defined by the appended claims.

XII. Additional Embodiments

The following should be interpreted as embodiments and not as claims.

A. A method, comprising:

determining a first position of a first race participant at an intermediate point within a race event;

determining a second position of a second race participant at an intermediate point within the race event;

determining an outcome of a game based, at least in part, on the first position and the second position, in which the outcome of the game may result from a plurality of possible game actions;

determining at least one game action based, at least in part, on the outcome; and providing an indication of the at least one game action.

A.1. The method of claim A, in which the game includes a card game and the at least one game action includes a deal of a card.

A.2. The method of claim A, in which the game includes a number-based game, and the at least one game action includes a choosing of a number.

A.2.1. The method of claim A.2, in which the number-based game includes a lottery game.

A.2.2. The method of claim A.2, in which the number-based game includes at least one of a keno game, and a dice-based game.

A.3. The method of claim A, in which the game includes at least one of a fantasy sports game, and a roulette game.

A.4. The method of claim A, in which the game includes a slot game, and the game action includes a choice of at least one slot symbol.

A.5. The method of claim A, in which determining the at least one game action includes choosing the at least one game action from a plurality of possible game actions that would result in the outcome.

A.6. The method of claim A, in which determining the outcome includes at least one of: using the first and second position as input for a random number generator, using the first and second position as input to a lookup table, and using the first and second position as input to a formula.

B. A method, comprising:

determining a position of at least one race participant at an intermediate point within a race event;

determining at least one number in a number-based game based, at least in part, on the determined position;

determining an outcome of the number-based game based, at least in part, on the at least one number; and providing an indication of the outcome.

B.1. The method of claim B, in which the number-based game includes a lottery game.

B.2. The method of claim B, in which the number-based game includes at least one of a keno game, and a dice-based game.

B.3. The method of claim B, further comprising determining a second position of the at least one race participant at a second intermediate point within the race event; and in which determining the at least one number includes determining the at least one number based, at least in part, on the determined position and the determined second position.

B.4. The method of claim B, further comprising determining a second position of at least one second race participant at a second intermediate point within the race event; and in which determining the at least one number includes determining the at least one number based, at least in part, on the determined position and the determined second position.

B.4.1. The method of claim B.4, in which the second intermediate point includes the first intermediate point.

B.5. The method of claim B, further comprising:

determining a second position of the at least one race participant at an intermediate point within the race event; and determining at least one second number in the number-based game based, at least in part, on the determined second position; and in which the outcome is based, at least in part, on the at least one number and the at least one second number.

B.6. The method of claim B, further comprising:

determining a second position of at least one second race participant at a second intermediate point within the race event; and determining at least one second number in the number-based game based, at least in part, on the determined second position; and in which the outcome is based, at least in part, on the at least one number and the at least one second number.

B.6.1. The method of claim B.6, in which the second intermediate point includes the first intermediate point.

B.7. The method of claim B, in which determining the at least one number includes at least one of: using the position as input for a random number generator, using the position as input to a lookup table, and using the position as input to a formula.

C. A method comprising:

determining a position of at least one race participant at an intermediate point within a race event;

determining at least one slot symbol for a slot game based, at least in part, on the determined position; and providing an indication of the at least one slot symbol.

C.1. The method of claim C, in which determining the at least one slot symbol includes selecting the at least one slot symbol from a plurality of possible slot symbols based, at least in part, on the determined position.

C.2. The method of claim C, further comprising determining a second position of the at least one race participant at a second intermediate point within the race event; and in which determining the at least one slot symbol includes determining the at least one slot symbol based, at least in part, on the determined position and the determined second position.

C.3. The method of claim C, further comprising determining a second position of at least one second race participant at a second intermediate point within the race event; and in which determining the at least one slot symbol includes determining the at least one slot symbol based, at least in part, on the determined position and the determined second position.

C.3.1. The method of claim C.3, in which the second intermediate point includes the first intermediate point.

C.4. The method of claim C, further comprising:
determining a second position of the at least one race participant at an intermediate point within the race event;
determining at least one second slot symbol for the slot game based, at least in part, on the determined second position; and
providing an indication of the at least one second slot symbol.

C.5. The method of claim C, further comprising:
determining a second position of at least one second race participant at a second intermediate point within the race event;
determining at least one second slot symbol for the slot game based, at least in part, on the determined second position; and
providing an indication of the at least one second slot symbol.

C.5.1. The method of claim C.5, in which the second intermediate point includes the first intermediate point.

C.6. The method of claim C, in which determining the at least one slot symbol includes at least one of: using the position as input for a random number generator, using the position as input to a lookup table, and using the position as input to a formula.

D. A method comprising:
determining at least one position of at least one race participant at at least one intermediate point within a race event; and
adjusting at least one characteristic of a simulated game based, at least in part on the at least one determined position.

D.1. The method of claim D, in which the simulated game includes at least one of a card game, a number-based game, a slot game, a roulette game, and a fantasy sports game.

D.2. The method of claim D, in which adjusting the at least one characteristic includes adjusting at least one characteristic that defines when the game is won, adjusting at least one characteristic that defines odds of the game, and at least one characteristic that defines an amount won by a winner of the game.

D.3. The method of claim D, in which adjusting the at least one characteristic includes enabling a bonus round of the game.

D.4. The method of claim D, in which determining the at least one position includes determining a plurality of positions of the at least one race participant at a plurality of intermediate points.

D.4.1. The method of claim D.4, in which adjusting includes adjusting based on a change in the plurality of positions.

D.4.2. The method of claim D.4, in which the at least one race participant includes a plurality of race participants

What is claimed is:

1. An apparatus comprising:
a network interface;
a memory;
at least one processor to:
receive, via the network interface, data indicative of a bet on an intermediate position of a race participant during a race;
generate in the memory a matrix such that each column of the matrix indicates an intermediate point of the race participant during the race and each row of the matrix represents a race participant;
populate each cell of the matrix with a predicted position of a respective player at an intermediate point in the race;
receive, from remote sensors via the network interface, data indicating actual positions of race participants at intermediate points of the race;
compare the actual positions from the remote sensor with the predicted positions;
identify matches between the actual positions and the predicted positions;
identify whether a particular number of matches occur consecutively in the matrix; and
in response to determining that the matches occur consecutively, identify whether the bet is a winning bet based at least partially on the matches identified in the matrix.

2. The apparatus of claim 1, wherein the at least one processor determines that the particular number of matches occur diagonally consecutive, horizontally consecutive, or vertically consecutive in the matrix.

3. The apparatus of claim 1, wherein the at least one processor determines that the bet is a winning bet, when the particular number of matches occur diagonally consecutive, horizontally consecutive, or vertically consecutive in the matrix.

4. The apparatus of claim 1, wherein the remotes sensors comprise cameras or teletimers.

5. The apparatus of claim 1, wherein the at least one processor is further configured to receive, via the network interface, a plurality of bets associated with the participants of the race.

6. The apparatus of claim 5, wherein each bet comprises a given predicted position of a given race participant at a given intermediate point in the race.

7. The apparatus of claim 5, wherein the at least one processor is further configured to generate the matrix in the memory based at least partially on the plurality of bets.

8. The apparatus of claim 7, wherein the at least one processor is further configured to transmit the matrix to an interface.

9. The apparatus of claim 7, wherein the at least one processor is further configured to transmit the matrix to a printing device.

10. A method comprising:
receiving, by at least one processor, data indicative of a bet on an intermediate position of a race participant during a race;
generating, by the at least one processor, a matrix in a memory such that each column of the matrix indicates an intermediate point of the race participant during the race and each row of the matrix represents a race participant;
populating, by the at least one processor, each cell of the matrix with a predicted position of a respective player at an intermediate point in the race;
receiving, by the at least one processor, data indicating actual positions of race participants at intermediate points of the race from remote sensors via a network interface;
comparing, by the at least one processor, the actual positions from the remote sensor with the predicted positions;
identifying, by the at least one processor, matches between the actual positions and the predicted positions;
identifying, by the at least one processor, whether a particular number of matches occur consecutively in the matrix; and
in response to determining that the matches occur consecutively, identifying, by the at least one processor, whether a bet is a winning bet based at least partially on the matches identified in the matrix.

11. The method of claim 10, further comprising determining, by the at least one processor, that the particular number of matches occur diagonally consecutive, horizontally consecutive, or vertically consecutive in the matrix.

12. The method of claim 10, further comprising determining, by the at least one processor, that the bet is a winning bet, when the particular number of matches occur diagonally consecutive, horizontally consecutive, or vertically consecutive in the matrix.

13. The method of claim 10, wherein the remotes sensors comprise cameras or teletimers.

14. The method of claim 10, further comprising receiving, by the at least one processor, via the network interface, a plurality of bets associated with the participants of the race.

15. The method of claim 14, wherein each bet comprises a given predicted position of a given race participant at a given intermediate point in the race.

16. The method of claim 14, wherein generating the matrix further comprises generating, by the at least one processor, the matrix in the memory based at least partially on the plurality of bets.

17. The method of claim 16, further comprising transmitting, by the at least one processor, the matrix to an interface.

18. The method of claim 16, further comprising transmitting, by the at least one processor, the matrix to a printing device.

* * * * *